US 11,284,386 B2

(12) United States Patent
Seo et al.

(10) Patent No.: US 11,284,386 B2
(45) Date of Patent: Mar. 22, 2022

(54) CORESET OPERATION METHOD IN WIRELESS COMMUNICATION SYSTEM, AND TERMINAL USING SAME METHOD

(71) Applicant: LG Electronics Inc., Seoul (KR)

(72) Inventors: Inkwon Seo, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/246,059

(22) Filed: Apr. 30, 2021

(65) Prior Publication Data

US 2021/0250928 A1 Aug. 12, 2021

Related U.S. Application Data

(63) Continuation of application No. PCT/KR2019/014854, filed on Nov. 4, 2019.

(60) Provisional application No. 62/754,618, filed on Nov. 2, 2018.

(30) Foreign Application Priority Data

Feb. 15, 2019  (KR) .................. 10-2019-0017645
Aug. 13, 2019  (KR) .................. 10-2019-0098852

(51) Int. Cl.
*H04W 72/04* (2009.01)

(52) U.S. Cl.
CPC ...... *H04W 72/042* (2013.01); *H04W 72/0453* (2013.01)

(58) Field of Classification Search
CPC .... H04W 72/042; H04W 72/04; H04W 72/12
See application file for complete search history.

(56) References Cited

U.S. PATENT DOCUMENTS

| | | | |
|---|---|---|---|
| 2017/0332359 A1 | 11/2017 | Tsai et al. | |
| 2018/0183551 A1* | 6/2018 | Chou | .............. H04L 5/0098 |
| 2019/0149286 A1* | 5/2019 | Zhang | .............. H04W 72/0453 |
| | | | 370/329 |
| 2019/0158326 A1* | 5/2019 | Liao | .............. H04L 5/0048 |
| 2020/0288447 A1* | 9/2020 | Shen | .............. H04L 5/0094 |
| 2020/0337027 A1* | 10/2020 | Lee | .............. H04W 72/042 |
| 2020/0358586 A1* | 11/2020 | Takeda | .............. H04W 72/12 |

(Continued)

OTHER PUBLICATIONS

Intel Corporation, "CORESETs for NR PDCCH," R1-1710543, 3GPP TSG RAN WG1 NR Adhoc #2, Qingdao, P.R. China, Jun. 27-30, 2017, 7 pages.

(Continued)

*Primary Examiner* — Chi Ho A Lee
(74) *Attorney, Agent, or Firm* — Fish & Richardson P.C.

(57) ABSTRACT

The present specification provides a method for receiving control resource set (CORESET) configuration information by a terminal in a wireless communication system, the method comprising: receiving the CORESET configuration information from a network, wherein the CORESET configuration information is information related to resource allocation of a CORESET; monitoring control information on the CORESET on the basis of the received CORESET configuration information; and receiving data information from the network on the basis of the monitored control information, wherein a reference point for the resource allocation of the CORESET includes a start point of each sub-band.

4 Claims, 34 Drawing Sheets

(56) References Cited

U.S. PATENT DOCUMENTS

| | | | |
|---|---|---|---|
| 2021/0160880 A1* | 5/2021 | Zhang | H04W 56/0045 |
| 2021/0168858 A1* | 6/2021 | Liu | H04L 5/0012 |
| 2021/0185683 A1* | 6/2021 | Reial | H04W 72/042 |

OTHER PUBLICATIONS

LG Electronics, "RMSI delivery and CORESET configuration," R1-1713125, 3GPP TSG RAN WG1 Meeting #90, Prague, Czech Republic, Aug. 21-25, 2017, 10 pages.

Nokia, Nokia Shanghai Bell, "On the remaining wider-band aspects of NR," R1-1714094, 3GPP TSG RAN WG1 Meeting #90, Prague, Czech Republic, Aug. 21-25, 2017, 8 pages.

NTT DOCOMO, Inc., "Offline summary for AI 7.1.3.1.1 PDCCH structure for URLLC," R1-1807637, 3GPP TSG RAN WG1 Meeting #93, Busan, Korea, May 21-25, 2018, 33 pages.

* cited by examiner

Non-interleaved CCE-to-REG mapping

CORESET OPERATION METHOD IN WIRELESS COMMUNICATION SYSTEM, AND TERMINAL USING SAME METHOD

CROSS-REFERENCE TO RELATED APPLICATIONS

Pursuant to 35 U.S.C. § 119(e), this application is a continuation of International Application PCT/KR2019/014854, with an international filing date of Nov. 4, 2019, which claims the benefit of U.S. Provisional Patent Application No. 62/754,618, filed on Nov. 2, 2018, Korean Patent Application No. 10-2019-0017645, filed on Feb. 15, 2019 and Korean Patent Application No. 10-2019-0098852, filed on Aug. 13, 2019. The disclosures of the prior applications are incorporated by reference in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

For easy wireless communication in NR, embodiments for a CORESET operation method need to be provided.

SUMMARY OF THE DISCLOSURE

Technical Solutions

According to an embodiment of the present disclosure, in a method for receiving control resource set (CORESET) configuration information, which is performed by a user equipment (UE) in a wireless communication system, provided herein is a method of a reference point for resource allocation of a CORESET being configured of starting points of each sub-band.

Effects of the Disclosure

In the present specification various effects may be provided. For example, since a reference point for frequency domain resource allocation of a CORESET may be configured of minimum resource blocks (RBs), and so on, of each resource group, efficiency of a wireless communication system may be enhanced.

Effects that may be achieved from the detailed examples of the present specification will not be limited only to the effects listed above. For example, various technical effects that can be understood or derived from the present specification by a person having ordinary skill in the related art may exist. Accordingly, the detailed effects of the present specification will not be limited only to those explicitly specified in the present specification and may include various effects that may be understood or derived from the technical characteristics (or features) of the present specification.

DESCRIPTION OF EXEMPLARY EMBODIMENTS

As used in the present specification, a slash (/) or comma (,) may indicate "and/or". For example, "A/B" may indicate "A and/or B", and therefore may mean "only A", "only B", or "A and B". Technical features that are separately described in one drawing may be implemented separately or implemented simultaneously. As used in the present specification, parentheses may indicate "for example". More specifically, "control information (PDCCH)" may mean that "PDCCH" is proposed as an example of the "control information". Additionally, "control information (i.e., PDCCH)" may also mean that "PDCCH" is proposed as an example of the "control information".

Hereinafter, in the present specification, it shall be interpreted that "/" and "," indicate "and/or". For example, "A/B" may mean "A and/or B". Additionally, "A, B" may also mean "A and/or B". Moreover, "A/B/C" may mean "at least any one of A, B and/or C". Furthermore, "A, B, C" may also mean "at least any one of A, B and/or C".

Furthermore, hereinafter, in the present specification, it shall be interpreted that "or" indicates "and/or". For example, "A or B" may include "only A", "only B", and/or "both A and B". In other words, it shall be interpreted that "or" indicates "additionally or alternatively".

Figure 1:
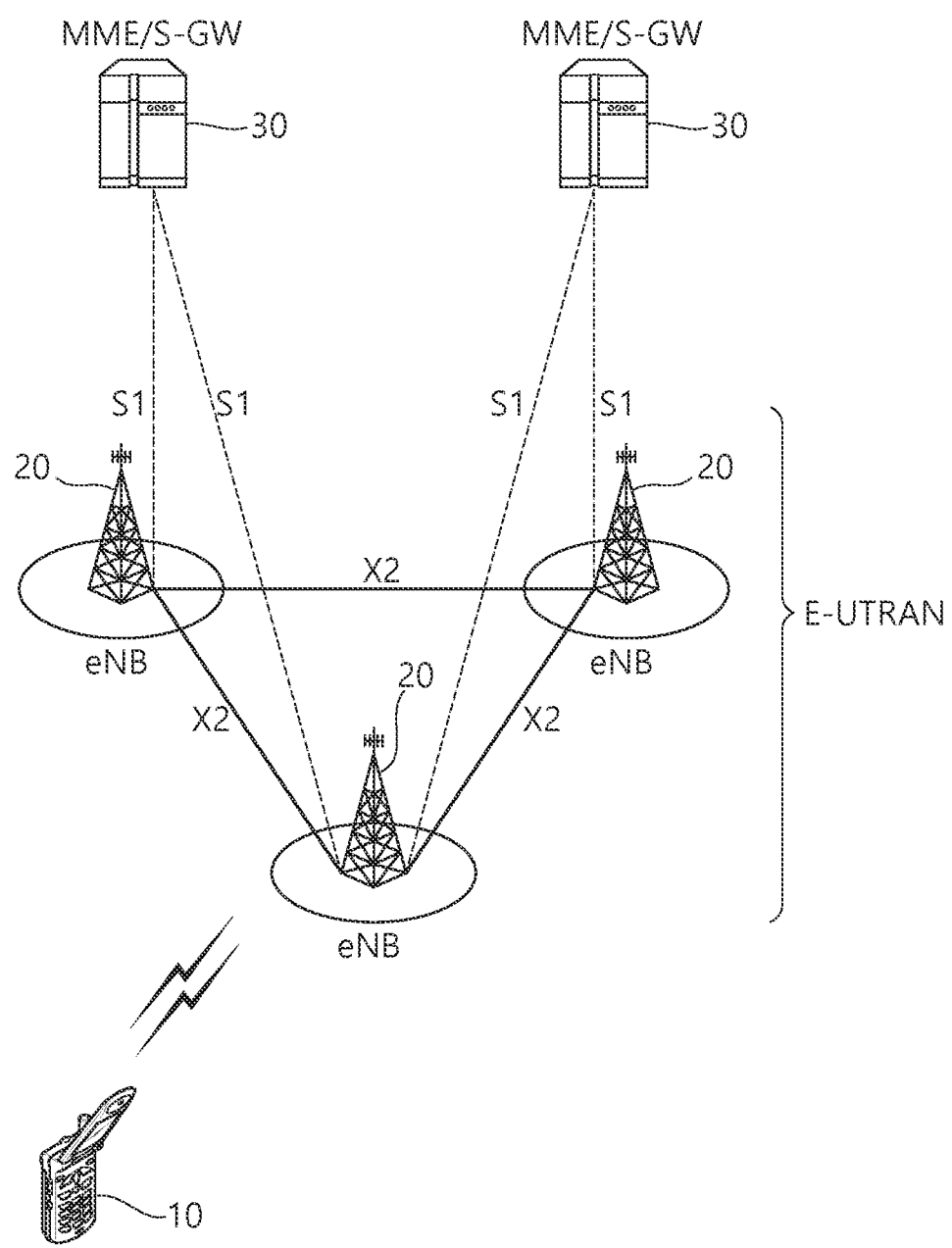
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
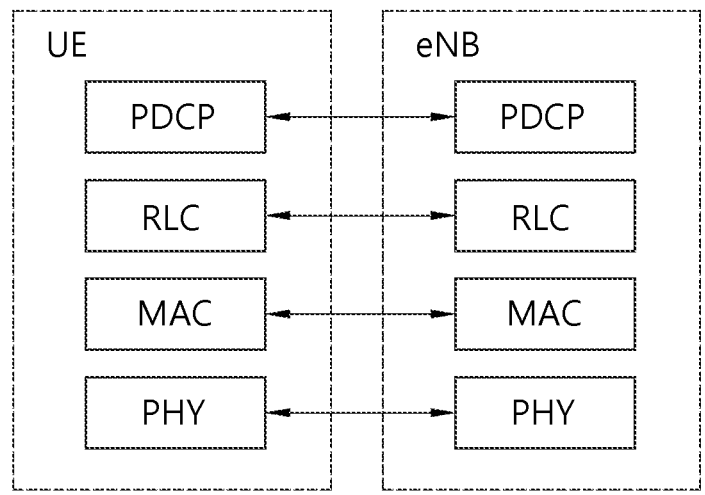
FIG. 2 is a diagram showing a wireless protocol architecture for a user plane.
Figure 3:
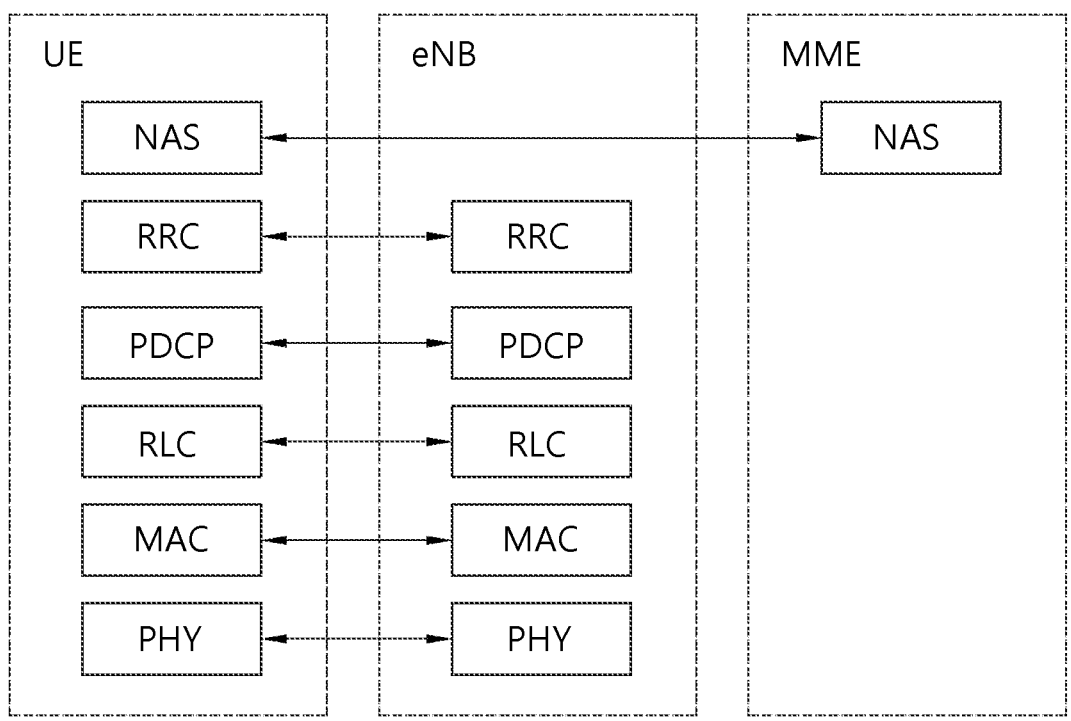
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 4:
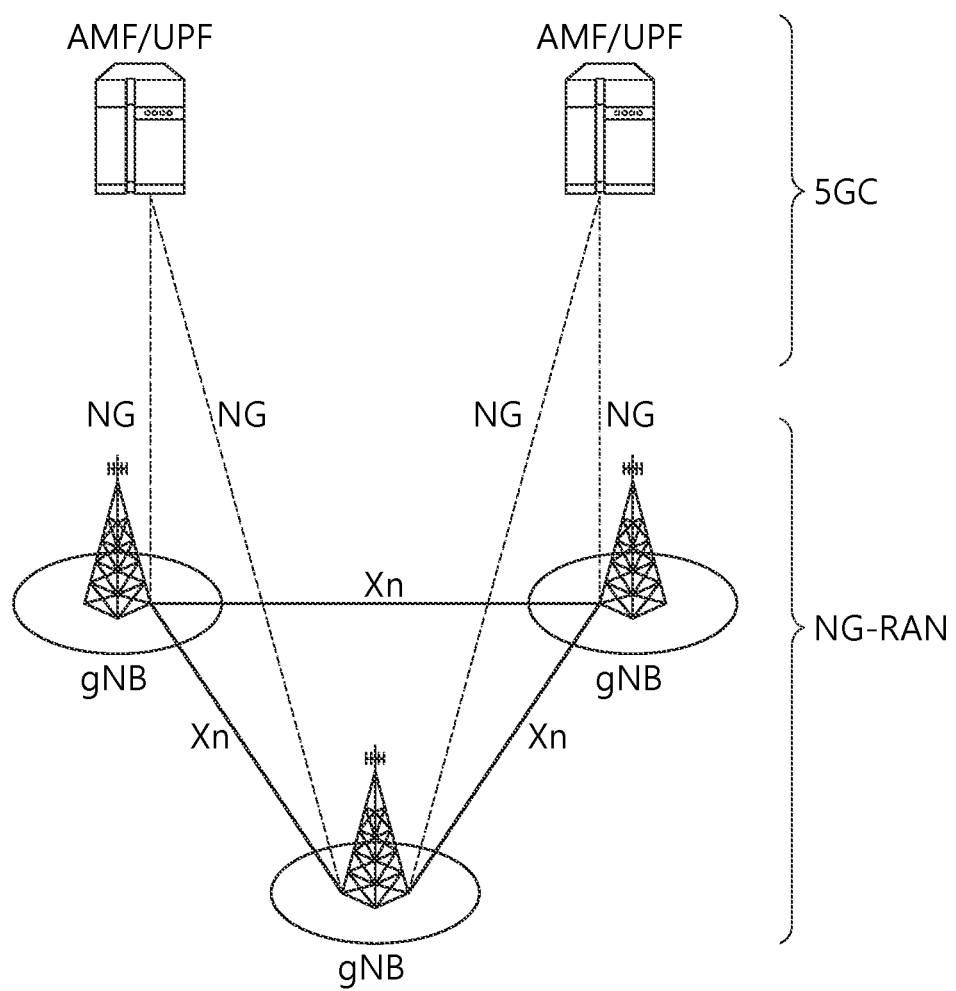
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
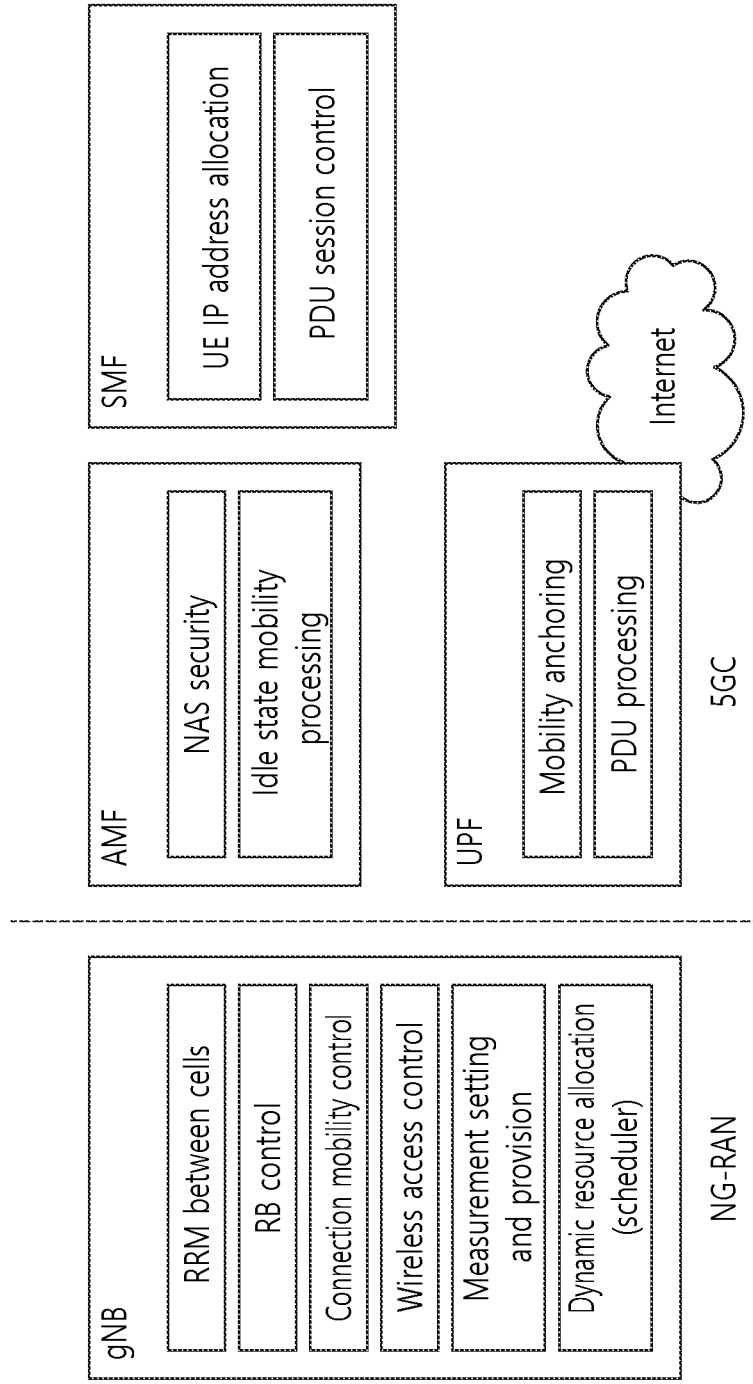
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
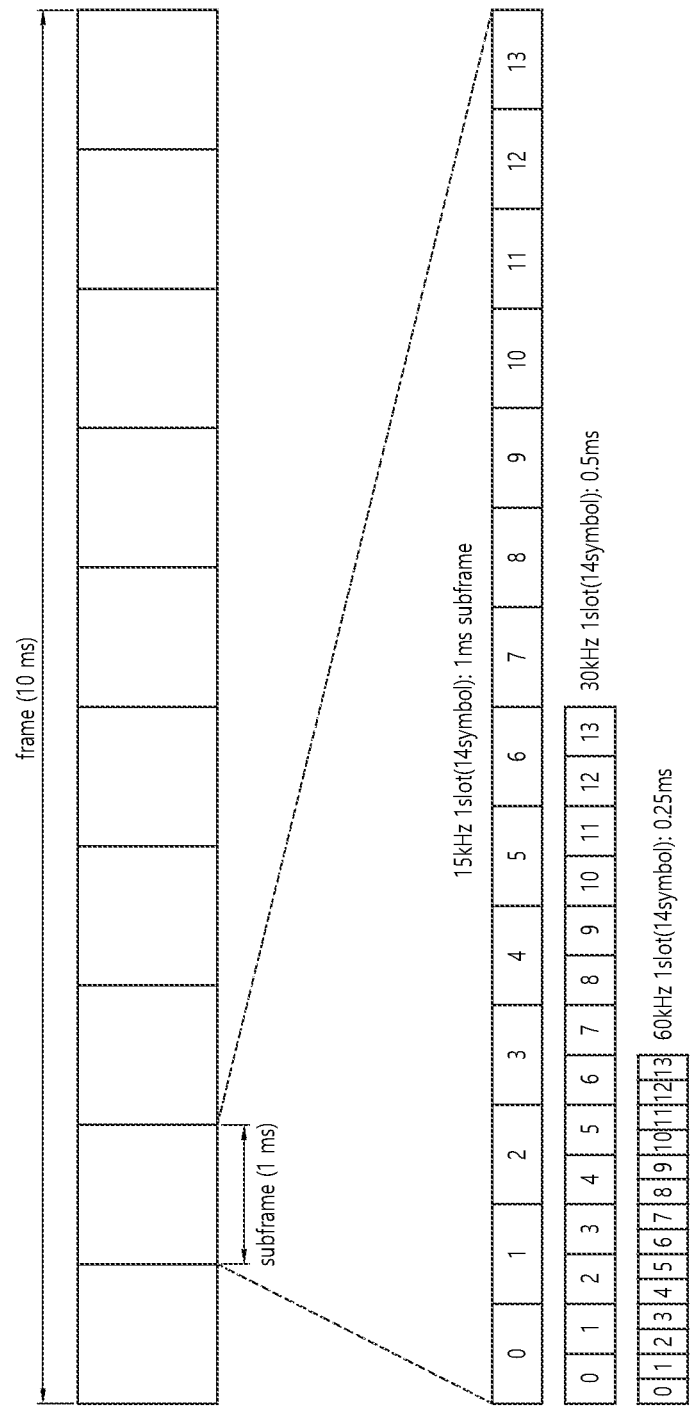
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration μ.

TABLE 1

| μ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows μ=0, 1, and 2.

A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. Meanwhile, in the NR, a new unit called a control resource set (CORESET) may be introduced. A UE may receive the PDCCH in the CORESET.

Figure 7:
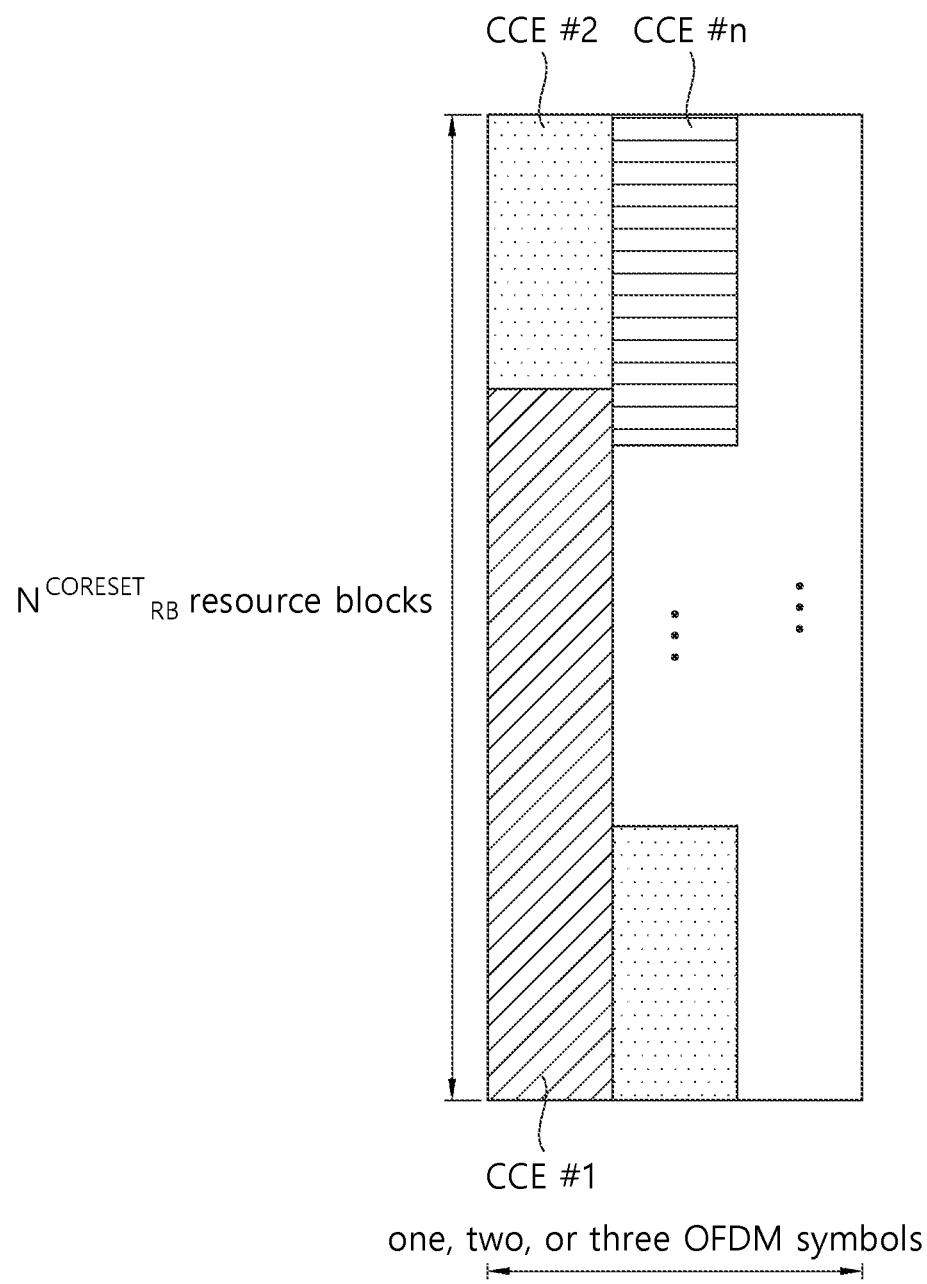
FIG. 7 illustrates a CORESET.

FIG. 7 illustrates a CORESET.

Referring to FIG. 7, the CORESET may include $N^{CORESET}_{RB}$ resource blocks in the frequency domain and $N^{CORESET}_{symb} \in \{1, 2, 3\}$ symbols in the time domain. $N^{CORESET}_{RB}$ and $N^{CORESET}_{symb}$ may be provided by a base station (BS) through higher layer signaling. As shown in FIG. 7, a plurality of CCEs (or REGs) may be included in the CORESET.

The UE may attempt to detect a PDCCH in units of 1, 2, 4, 8 or 16 CCEs in the CORESET. One or a plurality of CCEs for attempting PDCCH detection may be referred to as PDCCH candidates.

A plurality of CORESETs may be configured for the UE.

Figure 8:
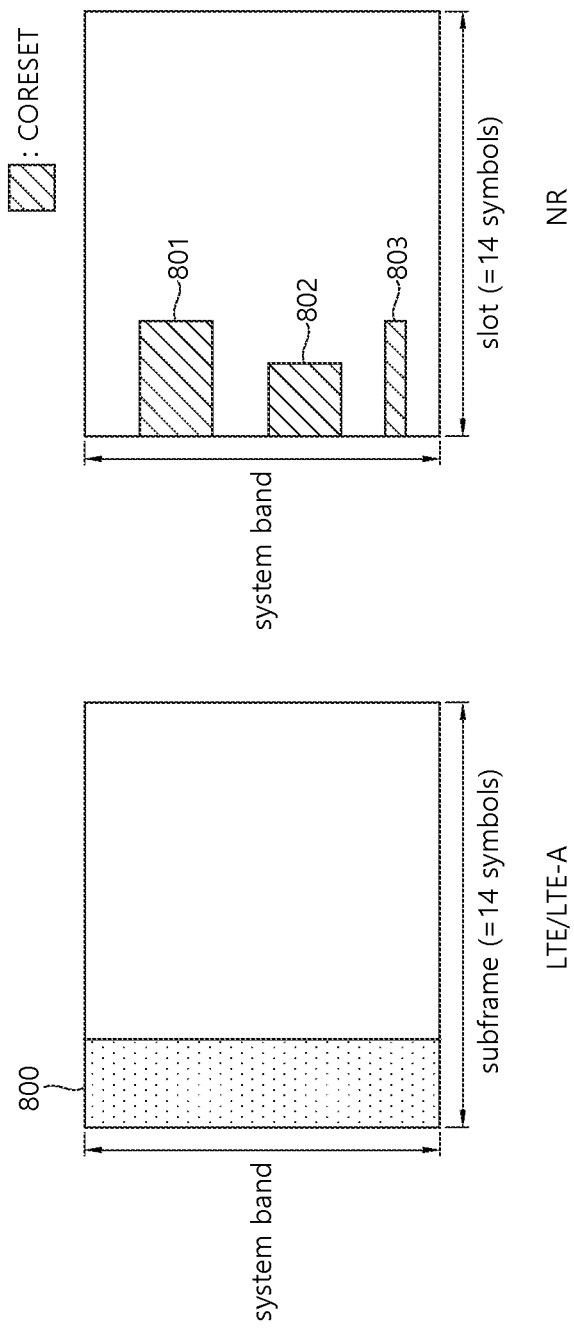
FIG. 8 is a view illustrating a difference between a legacy control region and a CORESET in the NR.

FIG. 8 is a view illustrating a difference between a legacy control region and a CORESET in the NR.

Referring to FIG. 8, a control region 800 in the legacy wireless communication system (e.g., LTE/LTE-A) is configured in the entire system band used by a BS. All terminals, excluding some UEs that support only a narrow band (e.g., eMTC/NB-IoT terminals), were supposed to be able to receive wireless signals of the entire system band of the BS in order to properly receive/decode control information transmitted from the BS.

Meanwhile, in the NR, the aforementioned CORESET was introduced. CORESETs (801, 802, 803) may be radio resources for control information that the UE should receive and may use only a part of the system band, not the entire system band. The BS may allocate the CORESET to each terminal, and may transmit control information through the allocated CORESET. For example, in FIG. 8, a first CORESET (801) may be allocated to UE 1, a second CORESET (802) may be allocated to UE 2, and a third CORESET (803) may be allocated to UE 3. The UE in the NR may receive the control information from the BS even if the UE does not necessarily receive the entire system band.

The CORESET may include a UE-specific CORESET for transmitting UE-specific control information and a common CORESET for transmitting control information common to all UEs.

Meanwhile, in the NR, high reliability may be required depending on an application field, and in this context, a target block error rate (BLER) for a downlink control information (DCI) transmitted through a downlink control channel (e.g., physical downlink control channel (PDCCH)) may be significantly lower than that of the related art. As an example of a method for satisfying the requirement for such high reliability, the amount of contents included in the DCI may be reduced and/or the amount of resources used in DCI transmission may be increased. Here, the resource may include at least one of a resource in the time domain, a resource in the frequency domain, a resource in a code domain, and a resource in a spatial domain.

The following technologies/characteristics may be applied to NR.

<Self-Contained Subframe Structure>

Figure 9:
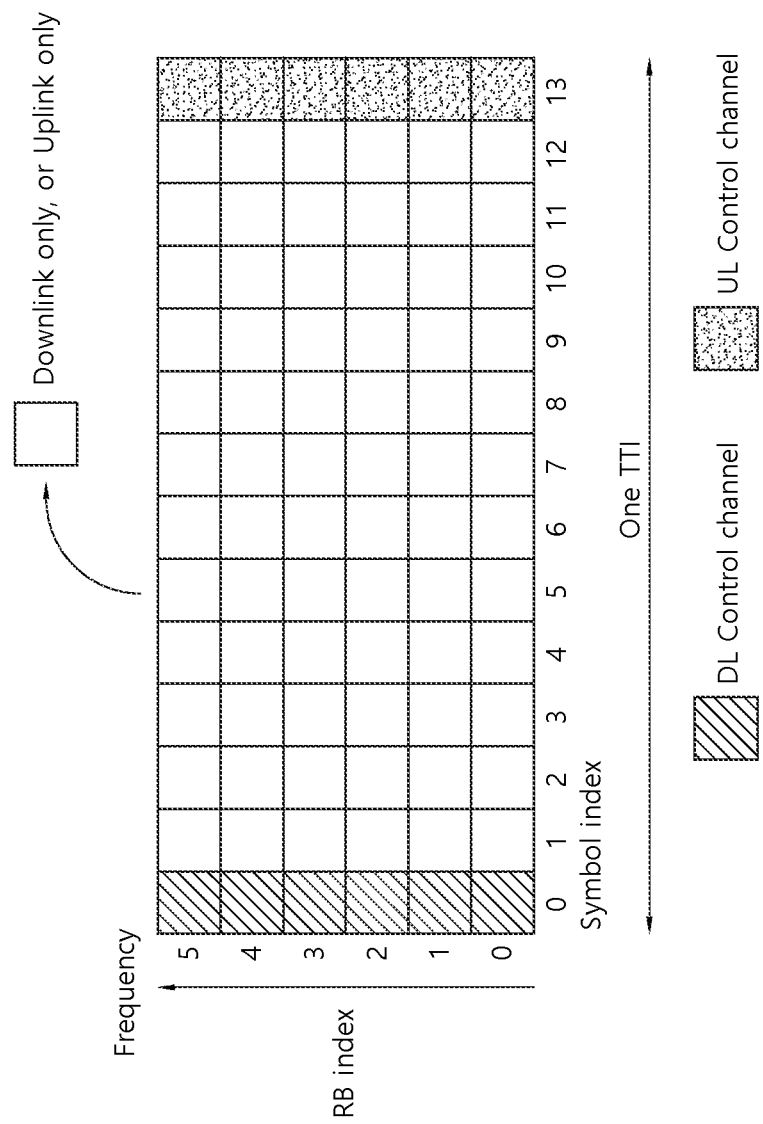
FIG. 9 shows an example of a frame structure for a new radio access technology (new RAT).

FIG. 9 illustrates an example of a frame structure for the new radio access technology (new RAT).

In NR, as a purpose for minimizing latency, as shown in FIG. 9, a structure having a control channel and a data channel being processed with Time Division Multiplexing (TDM), within one TTI, may be considered as one type of frame structure.

In FIG. 9, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

<Analog Beamforming #1>

In a Millimeter Wave (mmW), since the wavelength becomes short, installation of multiple antenna elements on a same surface becomes possible. That is, on a 30 GHz band, the wavelength is 1 cm, thereby enabling installation of a total of 100 antenna elements to be performed on a 5 by 5 cm panel in a 2-dimension (2D) alignment format at intervals of 0.5 wavelength (lambda). Therefore, in mmW, coverage shall be extended or throughput shall be increased by increasing beamforming (BF) gain using multiple antenna elements.

In this case, when a Transceiver Unit (TXRU) is provided so as to enable transport power and phase adjustment to be performed per antenna element, independent beamforming per frequency resource may be performed. However, there lies a problem of reducing effectiveness in light of cost in case of installing TXRU to all of the 100 or more antenna elements. Therefore, a method of mapping multiple antenna elements to one TXRU and adjusting beam direction by using an analog phase shifter is being considered. Since such analog beamforming method can only form a single beam direction within a full band, it is disadvantageous in that in cannot provide frequency selective beamforming.

As an intermediate form of digital beamforming (digital BF) and analog beamforming (analog BF), hybrid beamforming (hybrid BF) having B number of TXRUs, which is less than Q number of antenna elements, may be considered. In this case, although there are differences according to connection methods between the B number of TXRUs and the Q number of antenna elements, a direction of a beam that may be transmitted simultaneously shall be limited to B or below.

<Analog Beamforming #2>

In an NR system, in case multiple antennas are used, the usage of a hybrid beamforming method, which is a combination of digital beamforming and analog beamforming, is rising. At this point, analog beamforming is advantageous in that it performs precoding (or combining) at an RF end, thereby reducing the number of RF chains and the number of D/A (or A/D) converters as well as achieving a performance that is proximate to digital beamforming. For simplicity, the hybrid beamforming structure may be expressed as N number of TXRUs and M number of physical channels. Accordingly, digital beamforming for L number of data layers that are to be transmitted by the transmitter may be expressed as an N by L matrix. Then, after the converted N number of digital signals pass through the TXRU so as to be converted to analog signals, analog beamforming, which is expressed as an M by N matrix, is applied thereto.

Figure 10:
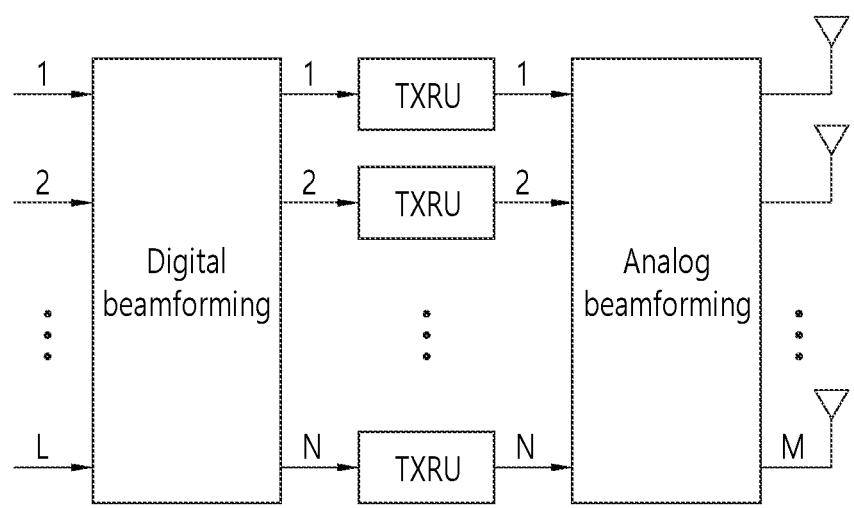
FIG. 10 is an abstract diagram of a hybrid beamforming structure in the viewpoints of the TXRU and physical antenna.

FIG. 10 is an abstract diagram of a hybrid beamforming structure in the viewpoints of the TXRU and physical antenna.

In FIG. 10, a number of digital beams is equal to L, and a number of analog beams is equal to N. Moreover, NR systems are considering a solution for supporting more efficient beamforming to a UE, which is located in a specific area, by designing the base station to be capable of changing beamforming to symbol units. Furthermore, in FIG. 10, when specific N number of TXRUs and M number of RF antennas are defined as a single antenna panel, a solution of adopting multiple antenna panels capable of having independent hybrid beamforming applied thereto is being considered in the NR system.

As described above, in case the base station uses multiple analog beams, since the analog beams that are advantageous for signal reception per UE may vary, for at least the synchronization signal, system information, paging, and so on, a beam sweeping operation is being considered. Herein, the beam sweeping operation allows the multiple analog beams that are to be applied by the base station to be changed per symbol so that all UEs can have reception opportunities.

Figure 11:
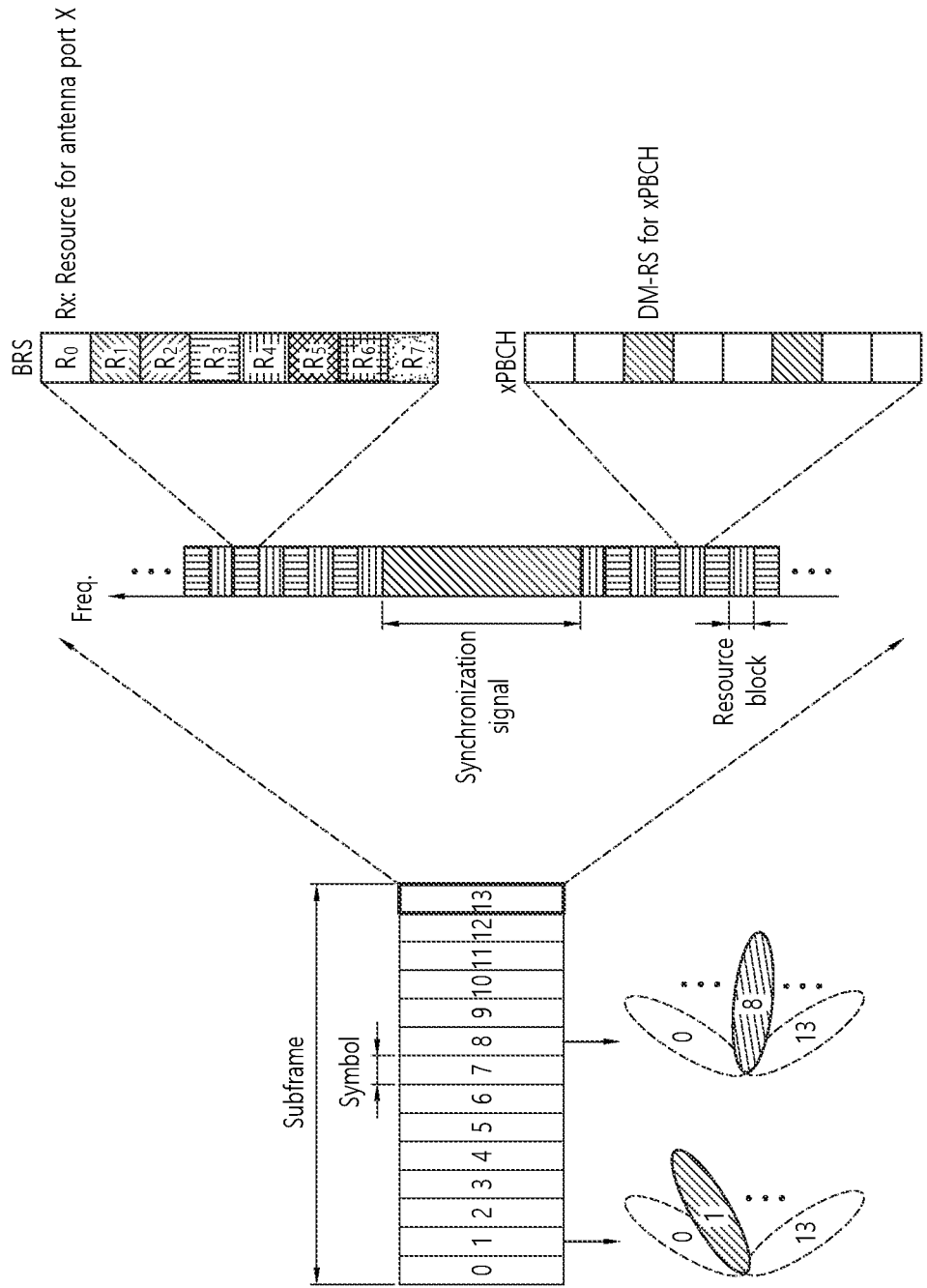
FIG. 11 is a schematic diagram of the beam sweeping operation for a synchronization signal and system information during a downlink (DL) transmission process.

FIG. 11 is a schematic diagram of the beam sweeping operation for a synchronization signal and system information during a downlink (DL) transmission process.

In FIG. 11, a physical resource (or physical channel) through which system information of the NR system is being transmitted by a broadcasting scheme is referred to as a physical broadcast channel (xPBCH). At this point, analog beams belonging to different antenna panels within a single symbol may be transmitted simultaneously. And, in order to measure a channel per analog beam, as shown in FIG. 11, a solution of adopting a beam reference signal (beam RS, BRS), which is a reference signal (RS) being transmitted after having a single analog beam (corresponding to a specific antenna panel) applied thereto. The BRS may be defined for multiple antenna ports, and each antenna port of the BRS may correspond to a single analog beam. At this point, unlike the BRS, a synchronization signal or xPBCH may be transmitted, after having all analog beams within an analog beam group applied thereto, so as to allow a random UE to successfully receive the signal.

Figure 12:
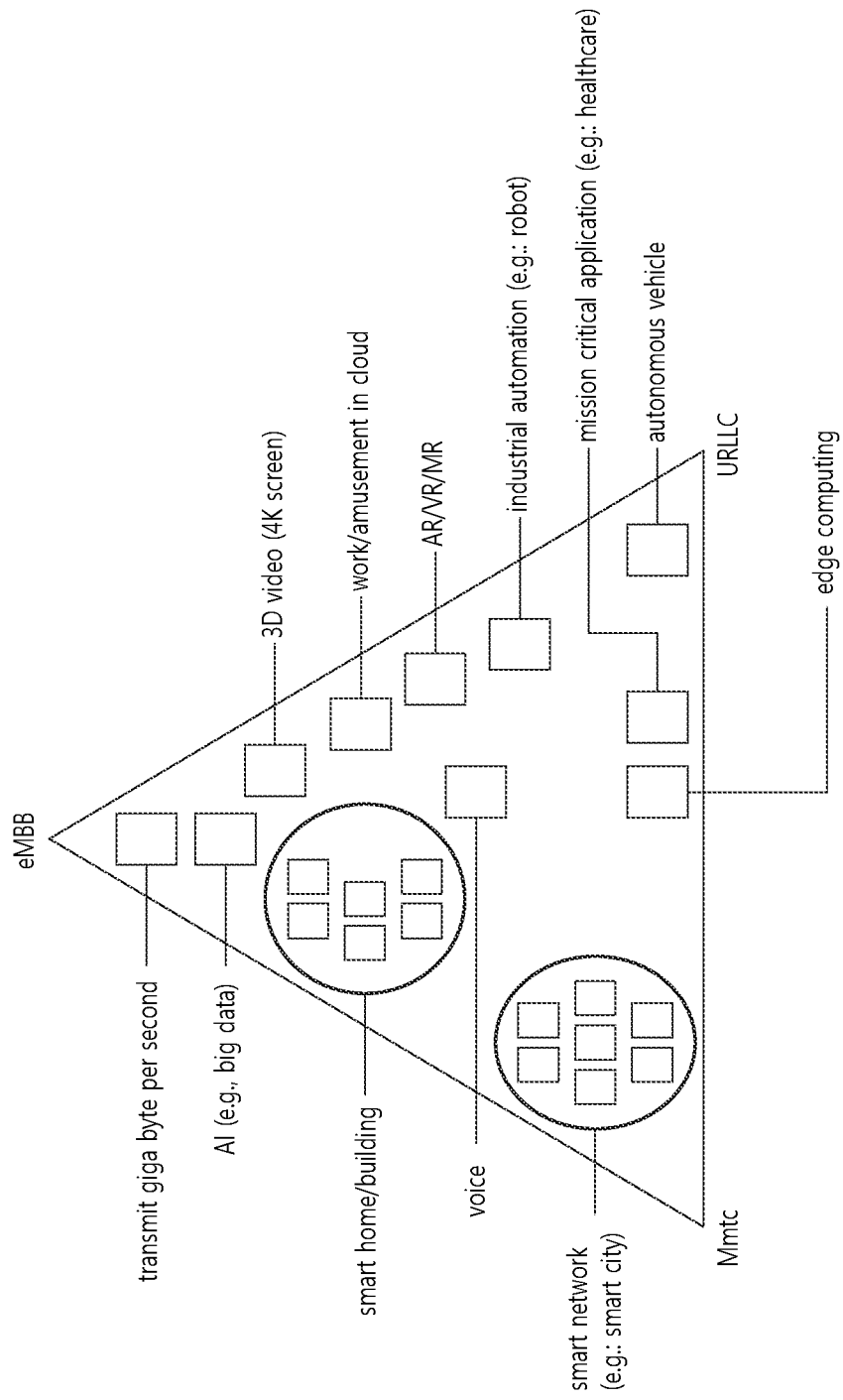
FIG. 12 shows examples of 5G usage scenarios to which the technical features of the present document can be applied.

FIG. 12 shows examples of 5G usage scenarios to which the technical features of the present specification can be applied. The 5G usage scenarios shown in FIG. 12 are only exemplary, and the technical features of the present specification can be applied to other 5G usage scenarios which are not shown in FIG. 12.

Referring to FIG. 12, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 12 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

<Bandwidth Part (BWP)>

In an NR system, up to 400 MHz may be supported per carrier. If a UE operating in such a wideband carrier while keeping a radio frequency (RF) module for the whole carrier in an ON state at all times, battery consumption of the UE may be increased. Alternatively, when considering various use cases of operation within a single wideband carrier (e.g., eMBB, URLLC, mMTC, V2X, and so on), different numerologies (e.g., subcarrier spacing) may be supported per frequency band within the corresponding carrier. Alternatively, the capability for a maximum (or widest) bandwidth may vary per UE. Considering this, a BS may instruct a UE to operate only on part of a bandwidth and not a full bandwidth of a wideband carrier. And, herein, the corresponding part of a bandwidth will be referred to as a bandwidth part (BWP). In a frequency domain, a BWP is a subset of contiguous common resource blocks, which are defined for numerology $\mu_i$ within bandwidth part i on a carrier. And, herein, one numerology (e.g., subcarrier spacing, CP length, slot/mini-slot duration) may be configured.

Meanwhile, the BS may configure one or more BWPs within one carrier being configured to a UE. Alternatively, in case UEs are concentrated to a specific BWP, part of the UEs may be re-located to a different BWP for load balancing. Alternatively, considering frequency domain inter-cell interference cancellation, and so on, between neighboring cells, among the full bandwidth, part of the spectrum may be excluded, and BWPs on both sides of the cell may be configured within the same slot. That is, the BS may configure at least one DL/UL BWP to a UE associated with a wideband carrier, and, among the configured DL/UL BWP(s), and the BS may activate at least one DL/UL BWP (via L1 signaling, which is a physical layer control signal, a control element (CE), which is a MAC layer control signal, or RRC signaling, and so on) at a specific time point and may instruct the UE to switch to another configured DL/UL BWP (via L1 signaling, MAC CE, or RRC signaling, and so on), or the BS may configure a timer value, and, when the timer is expired, the BS may instruct the UE to switch to a determined DL/UL BWP. An activated DL/UL BWP is particularly referred to as an active DL/UL BWP. When the UE is performing an initial access process, or in a situation where RRC connection of the UE is before setup, the UE may not be capable of receiving configuration for the DL/UL BWP. A DL/UL BWP that is assumed by the UE in such situation is referred to as an initial active DL/UL BWP.

<Downlink Channel Structure>

The base station transmits, to a UE, a related signal through a downlink channel, which will be described later on, and a UE receives, from the base station, a related signal through a downlink channel, which will be described later on.

(1) Physical Downlink Shared Channel (PDSCH)

A PDSCH carries downlink data (e.g., DL-shared channel transport block (DL-SCH TB), and modulation methods, such as Quadrature Phase Shift Keying (QPSK), 16 Quadrature Amplitude Modulation (QAM), 64 QAM, 256 QAM, and so on, are applied herein. A codeword is generated by encoding a TB. The PDSCH may transport (or carry) up to 2 codewords. Scrambling and modulation mapping are performed per codeword, and modulation symbols that are generated from each codeword are mapped to one or more layers (layer mapping). Each layer is mapped to a resource along with a Demodulation Reference Signal (DMRS) so as to be generated as an OFDM symbol, which is then transmitted through a corresponding antenna port.

(2) Physical Downlink Control Channel (PDCCH)

A PDCCH carries downlink control information (DCI), and a QPSK modulation method is applied herein. One PDCCH is configured of 1, 2, 4, 8, 16 Control Channel Elements (CCEs) in accordance with an aggregation level (AL). One CCE is configured of 6 Resource Element Groups (REGs). And, one REG is defined by one OFDM symbol and one (P)RB.

Figure 13:
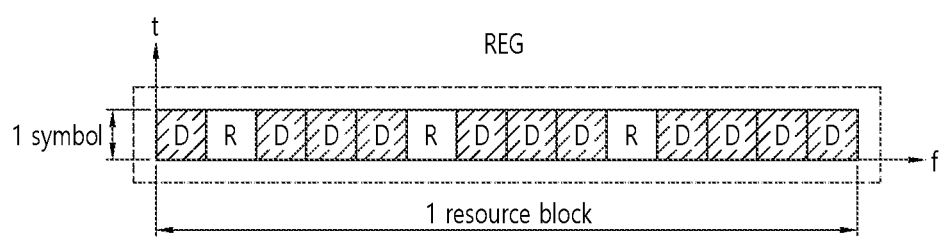
FIG. 13 shows an example of an REG structure.

FIG. 13 shows an example of an REG structure.

In FIG. 13, D indicates a resource element (RE) having DCI mapped thereto, and R indicates an RE having a DMRS mapped thereto. DMRS is mapped to first, fifth, and ninth REs along a frequency domain direction within one symbol.

A PDCCH is transmitted through a Control Resource Set (CORESET). A CORESET is defined as an REG set having a given numerology (e.g., SCS, CP length, and so on). Multiple CORESETs for one UE may be overlapped in a time/frequency domain. A CORESET may be configured through system information (e.g., MIB) or UE-specific higher layer (e.g., Radio Resource Control (RRC) layer) signaling. More specifically, a number of RBs and a number of symbols (3 or less) configuring a CORESET may be configured via higher layer signaling.

A precoder granularity within a frequency domain for each CORESET is configured, via higher layer signaling, as one of the following:
  sameAsREG-bundle: same REG bundle size as a frequency domain
  allContiguousRBs: same number of contiguous RBs in a frequency domain within a CORESET.

REGs within a CORESET are numbered based on a time-first mapping manner. That is, REGs are sequentially numbered from 0 starting from a first OFDM symbol of a lowest numbered resource block within a CORESET.

A mapping type from CCE to REG is configured as a non-interleaved CCE-REG mapping type or an interleaved CCE-REG mapping type.

Figure 14:
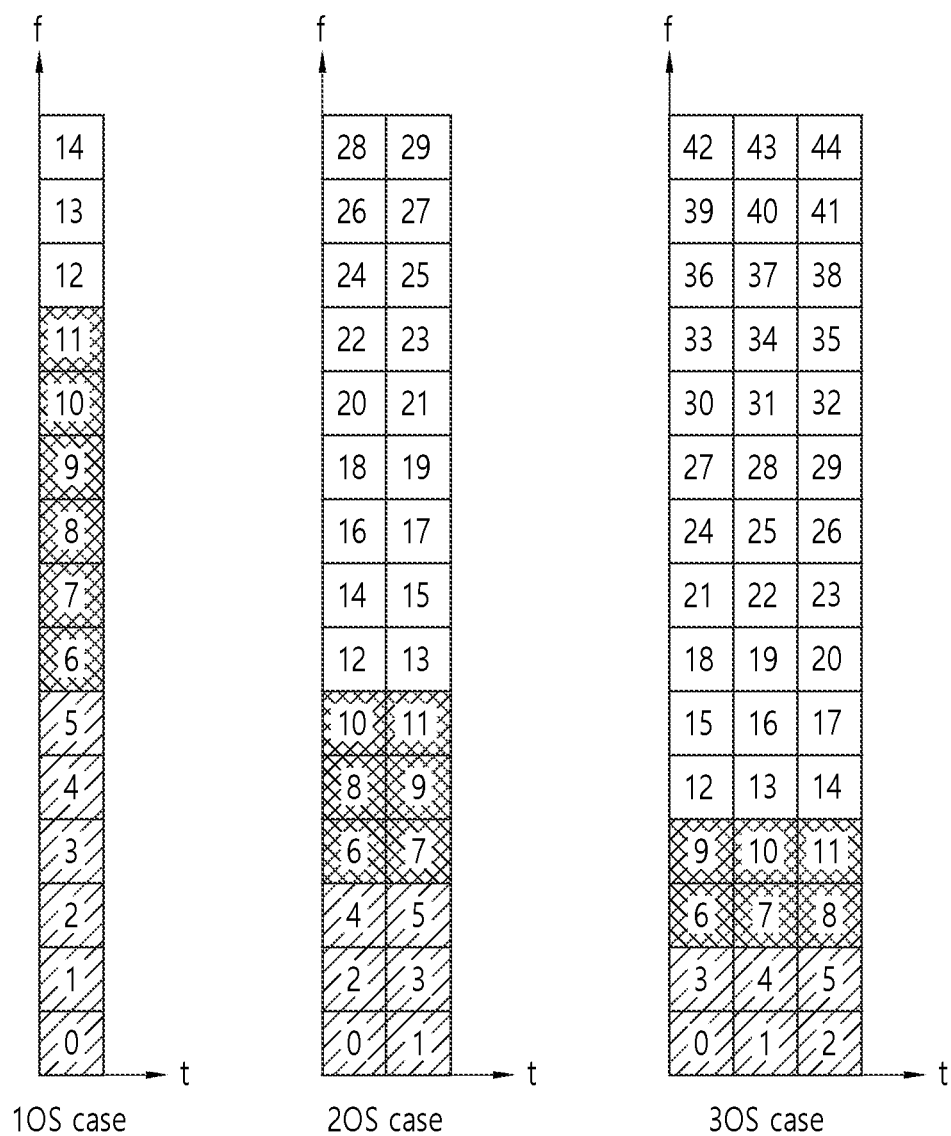
FIG. 14 shows an example of a non-interleaved CCE-REG mapping type.
Figure 15:
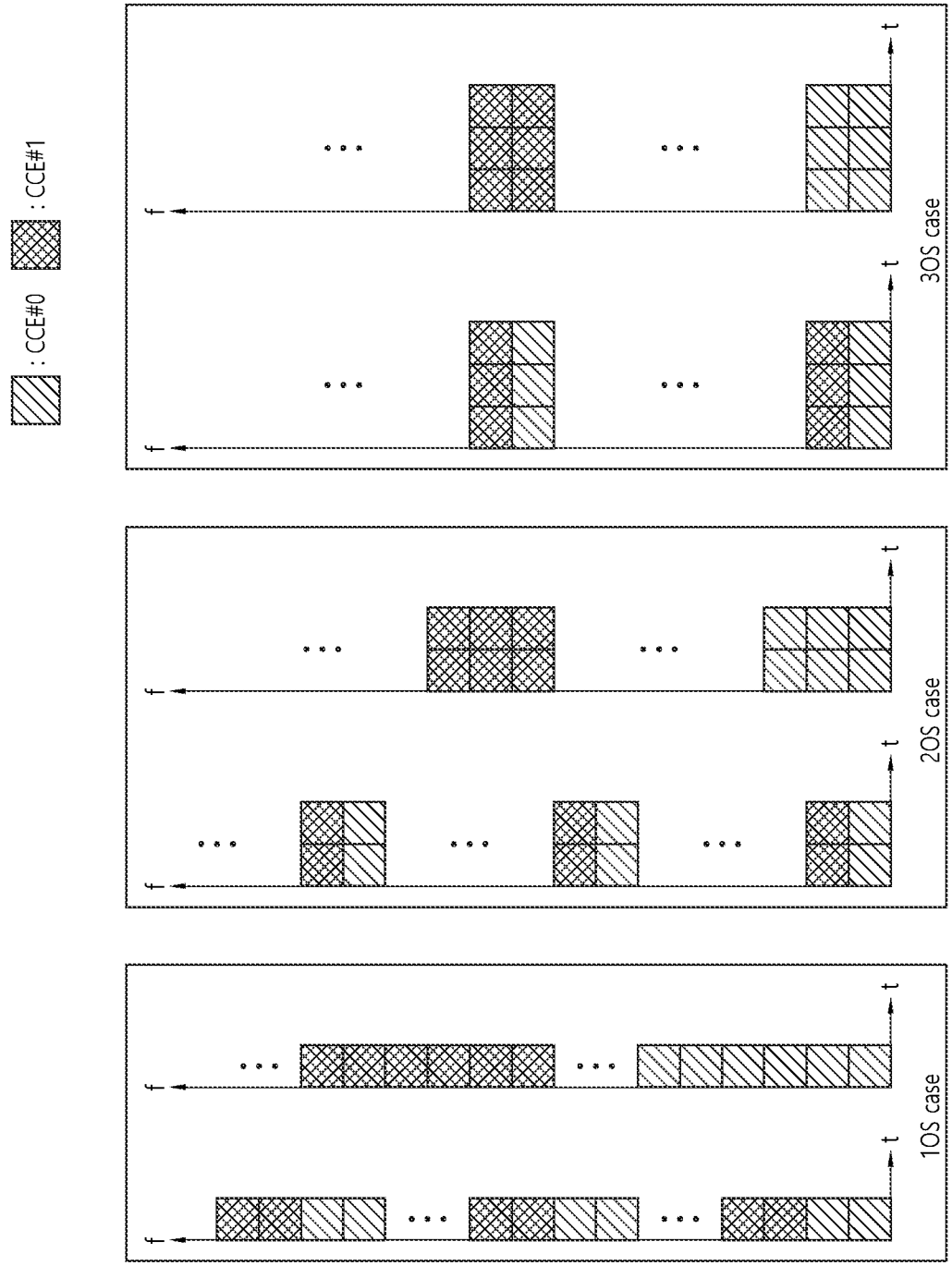
FIG. 15 shows an example of an interleaved CCE-REG mapping type.

FIG. 14 shows an example of anon-interleaved CCE-REG mapping type, and FIG. 15 shows an example of an interleaved CCE-REG mapping type.

A non-interleaved CCE-REG mapping type (or Localized mapping type): 6 REGs for a given CCE configures one REG bundle, and all REGs for a given CCE are contiguous. One REG bundle corresponds to one CCE.

An interleaved CCE-REG mapping type (or Distributed mapping type): 2, 3, or 6 REGs for a given CCE configures one REG bundle, an REG bundle is interleaved within a CORESET. REG bundles within a CORESET being configured of 1 OFDM symbol or 2 OFDM symbols are configured of 2 or 6 REGs. And, REG bundles within a CORESET being configured of 3 OFDM symbols are configured of 3 or 6 REGs. The size of an REG bundle is configured per CORESET.

Figure 16:
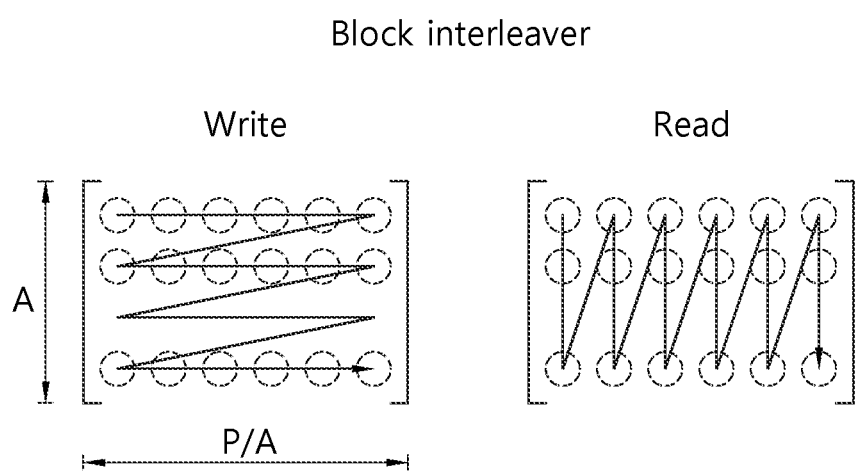
FIG. 16 shows an example of a block interleaver.

FIG. 16 shows an example of a block interleaver.

A number of rows (A) of a (block) interleaver for the above-described interleaving operation is configured of one of 2, 3, and 6 rows. In case a number of interleaving units for a given CORESET is equal to P, a number of columns of a block interleaver is equal to P/A. A Write operation for the block interleaver is performed along a row-first direction, as shown below in FIG. 16, and a Read operation is performed along a column-first direction. A cyclic shift (CS) of an interleaving unit is applied based on an ID that can be configured independently from an ID that is configurable for a DMRS.

A UE performs decoding (also referred to as blind decoding) on a set of PDCCH candidates and obtains DCI, which is transmitted through a PDCCH. The set of PDCCH candidates being decoded by the UE is defined as a PDCCH search space set. A search space set may be a common search space or a UE-specific search space. The UE may obtain DCI by monitoring a PDCCH candidate within one or more search space sets, which are configured via MIB or higher layer signaling. Each CORESET configuration is associated with one or more search space sets, and each search space set is associated with a CORESET configuration. One search space set is determined based on the parameters listed below.
  controlResourceSetId: this indicates a control resource set related to a search space set.
  monitoringSlotPeriodicityAndOffset: this indicates PDCCH monitoring period duration (slot unit) and PDCCH monitoring duration offset (slot unit).
  monitoringSymbolsWithinSlot: this indicates a PDCCH monitoring pattern within a slot for PDCCH monitoring (e.g., this indicates first symbol(s) of a control resource set).
  nrofCandidates: this indicates a number of PDCCH candidates per AL={1, 2, 4, 8, 16} (one of values 0, 1, 2, 3, 4, 5, 6, 8).

DCI format 0_0 may be used for scheduling a TB-based (or TB-level) PUSCH, DCI format 0_1 may be used for scheduling a TB-based (or TB-level) PUSCH or a Code Block Group (CBG)-based (or CBG-level) PUSCH. DCI format 1_0 may be used for scheduling a TB-based (or TB-level) PDSCH, DCI format 1_1 may be used for scheduling a TB-based (or TB-level) PDSCH or a CBG-based (or CBG-level) PDSCH. DCI format 2_0 is used for delivering dynamic slot format information (e.g., dynamic SFI) to a UE, and DCI format 2_1 is used for delivering downlink pre-Emption information to a UE. DCI format 2_0 and/or DCI format 2_1 may be delivered to UEs within a corresponding group through a group common PDCCH, which is a PDCCH being delivered to UEs that are defined as one group.

Hereinafter, proposals of the present specification will be described in more detail.

In an NR system, a control channel may be configured by a control resource set (CORESET) and a search space set (SS set). And, a CORESET configuration configures resource for configuring a search space and characteristics (e.g., REG bundle size, CCE-to-REG mapping, interleaver parameter, REG/CCE indexing) of the corresponding resource region. And, a search space set configuration performs a function of indicating a DCI format, an aggregation level (AL), a number of candidates per AL, which are to be monitored by the corresponding search space set, and monitoring occasion information of the corresponding search space set.

Each UE may configure up to 4 BWPs per cell and up to 3 CORESETs per BWP and 10 search space sets.

In a region where the UE operates, in some occasions, if there occurs a case where a resource cannot be used, the network may consider a method of partitioning a whole resource and operating per resource group. At this point, in case of a control channel, configuring a CORESET and search space set per resource group may be avoided for reasons, such as increase in signaling overhead. The present specification proposes a method for configuring a control channel in such situation (i.e., a method of partitioning a whole resource and operating per resource group).

In this specification, a whole resource may mean (a whole or part of) a BW of an active BWP that is configured to a specific UE. And, a whole resource may be divided into specific unit BWs (e.g., 20 MHz), and each unit BW may correspond to one resource group.

This, for example, may be valid in an NR system operating at an unlicensed band (e.g., 5 GHz or 6 GHz band). For example, considering a fair coexistence with a co-existing Wi-Fi, when a channel access procedure (CAP) is performed per unit BW, and when transmission is authorized (or allowed) only for the unit BW(s) having successfully completed the CAP, a control channel method considering such conditions may be applied. The method will be described below in the following description.

Meanwhile, general operations of the UE according to the embodiment of the present specification will be described below. The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

Figure 17:
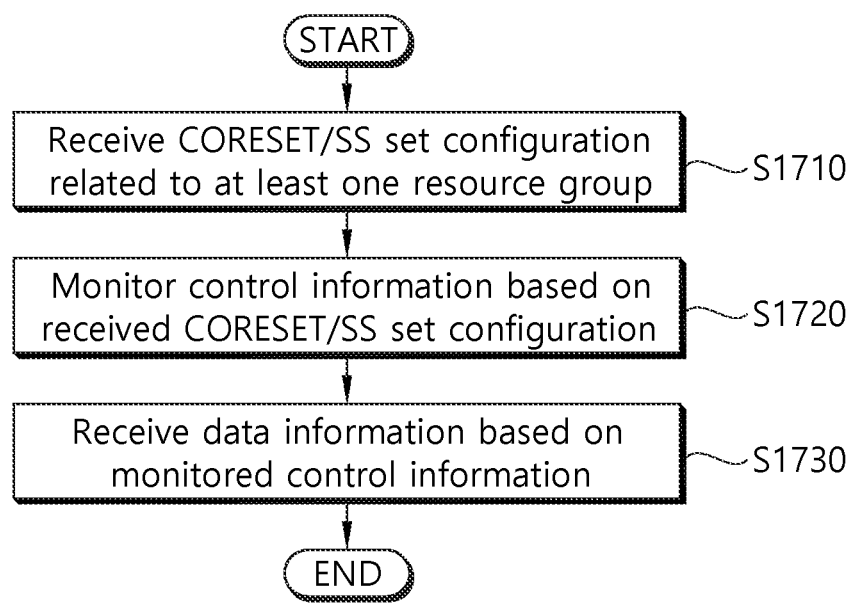
FIG. 17 is a flowchart showing a general example of the UE monitoring control information.

FIG. 17 is a flowchart showing a general example of the UE monitoring control information.

According to FIG. 17, a UE may receive a CORESET/SS set configuration related to at least one resource group (S1710). Herein, a more detailed example of a CORESET/SS set configuration is as described below (or as described above).

The UE may monitor control information based on the received CORESET/SS set configuration (S1720). Herein, a more detailed example of monitoring the control information (e.g., PDCCH) based on the CORESET/SS set configuration is as described below (or as described above).

The UE may receive data information based on the monitored control information (S1730). Herein, a more detailed example of receiving the data information (e.g., PDCCH) based on the monitored control information is as described below (or as described above).

Hereinafter, various embodiments (e.g., embodiments for Method 0 to Method 4 and/or the above-described embodiments) that may be applied to the embodiment of the present specification (e.g., this may be the embodiment of FIG. 17. However, the following embodiments will not be applied only for the embodiment of FIG. 17.) will be described in detail.

<Method 0: Resource Group Specific CORESET/SS Set with Different Configurations>

As a simplest method, the network may signal, to the UE, a CORESET/SS set configuration per resource group. In this case, the network may apply transmit diversity, frequency diversity, and so on, through the configurations per resource group, and may implement load balancing, and so on, between UEs through different SS set configurations.

Herein, in case of using a BWP by dividing a whole resource into unit resources in order to apply a resource group specific CORESET/SS set with different configurations, a limit in the number of CORESET/SS sets per BWP may not be applied.

Figure 18:
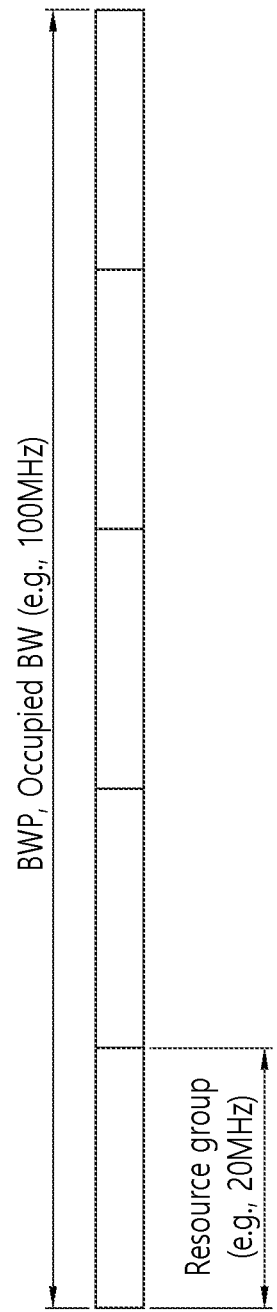
FIG. 18 shows an example of resource to which the present specification is applied.

FIG. 18 shows an example of resource to which the present specification is applied.

As shown in the drawing, (a whole or part of) a BW of an active BWP that is configured to a specific UE may be divided into specific unit BWs (e.g., 20 MHz), and the network may determine usage or not-usage per unit BW.

In this case, in case of transmitting/receiving data in unit BW units, since resource efficiency may be degraded due to a guard resource, and so on, which is used for reducing leakage to the outside of each unit BW, the present specification proposes to configure a resource group as one unit BW or a sum of multiple unit BWs, and proposes the network to instruct the corresponding information to the UE (via higher layer signaling, and so on).

This may be equally applied to PDCCH, PDSCH transmission/reception, or may be applied independently from the PDCCH and PDSCH.

Herein, each unit BW is not necessarily required to correspond to one resource group. For example, for PDCCH transmission/reception, 2 unit BWs may be defined as one resource group, and, for PDSCH transmission/reception, a whole resource may be defined as a resource group.

That is, the network may configure a resource group for PDCCH/PDSCH transmission/reception (or for the transmission/reception of each of the PDCCH and the PDSCH) and instruct this configuration to the UE, and each resource group may be configured as a combination of unit resources.

Figure 19:
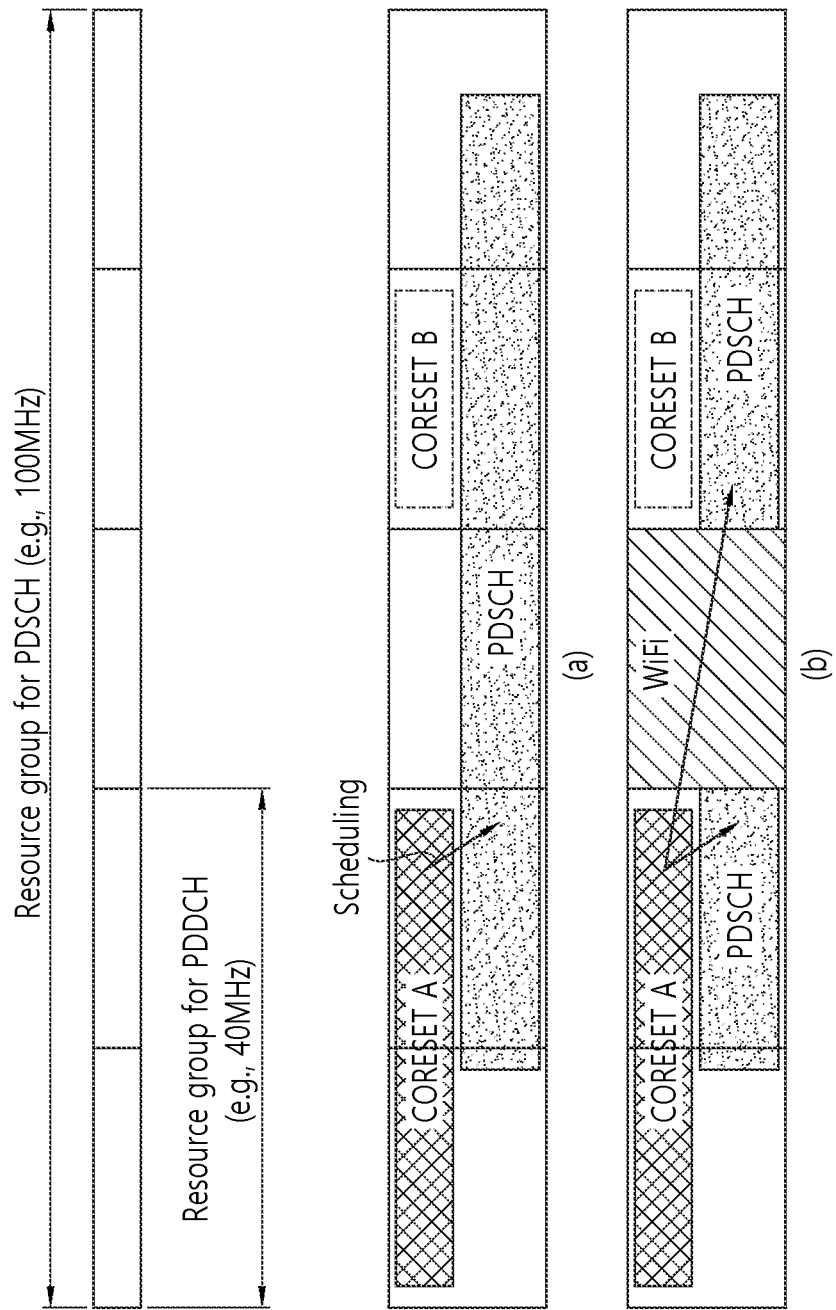
FIG. 19 shows an embodiment of the present specification for PDCCH/PDSCH transmission/reception.

FIG. 19 shows an embodiment of the present specification for PDCCH/PDSCH transmission/reception.

In the drawing, it is assumed that a resource group for PDCCH is configured of 2 unit resources at 40 MHz, and that a resource group for PDSCH is configured of 5 unit resources at 100 MHz.

A resource group for PDCCH being configured of 2 unit resources may mean that PDCCH monitoring for a CORESET being included in the corresponding 2 unit resources may be performed. For this, the network may configure multiple CORESETs, and the UE may only perform monitoring for a CORESET being included in the configured resource group.

For example, in FIG. 19(a), although a UE receives CORESET A and CORESET B configurations, since CORESET B is not included in the resource group for PDCCH, CORESET B may not perform monitoring. As described above, the network may more flexibly adjust multi-RAT operation, co-existence with Wi-Fi, and so on, through a modularized resource structure.

Additionally, the network may indicate a resource that cannot be used among unit resources via L1 signaling or higher layer signaling.

The UE may not perform monitoring on a CORESET including a unit resource that cannot be used. And, in case the CORESET includes a unit resource that cannot be used within a PDSCH region, which is scheduled by the PDCCH, it may be assumed that rate matching is performed on the PDSCH for the corresponding region. (Alternatively, in case a scheduled PDSCH overlaps with a unit resource that cannot be used, it may be assumed that the corresponding scheduling is not valid.)

Additionally, the present specification proposes a method for configuring a CORESET, which is configured throughout multiple unit resources. In case the resource is divided as shown in FIG. 18, in order to reduce interference to a contiguous unit resource, a guard resource may be defined for each unit resource.

Figure 20:
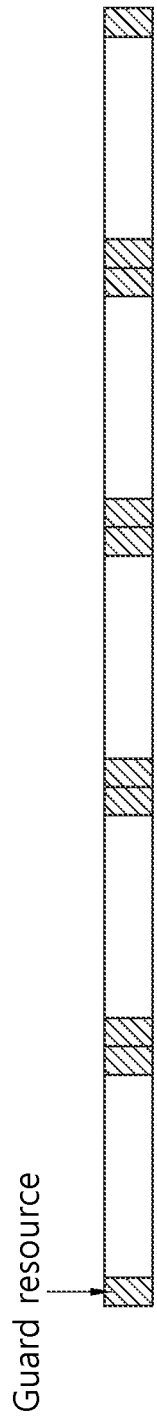
FIG. 20 generally shows an example of a case where a guard resource is applied to the example of FIG. 18.

FIG. 20 generally shows an example of a case where a guard resource is applied to the example of FIG. 18.

Herein, for example, it may be assumed that there is no signal transmission/reception in a guard resource.

In case of considering a guard resource, a method for configuring a guard resource according to a resource group size and configuring a CORESET resource in a resource group configured of multiple unit resources shall be defined.

For this, the present specification proposes the usage of the following method.

The following proposal may be instructed to the UE through a method wherein one of the options is defined, or wherein one of the options is configured by the network, and so on. (Alternatively, an option that is applied in accordance with a position within a time domain may be selected. For example, Option 1 may be applied at the beginning of the monitoring of the corresponding BWP, and Option 2 may be applied in a case where it is verified (or confirmed) that a specific resource can be used during a specific time.)

Additionally, in the following embodiment, although it is assumed that one CORESET is configured throughout contiguous unit resources, in the present specification, CORESETs being configured in each unit resource may also include content being integrated to one CORESET (in a resource group being configured of a combination of the corresponding unit resources).

Figure 21:
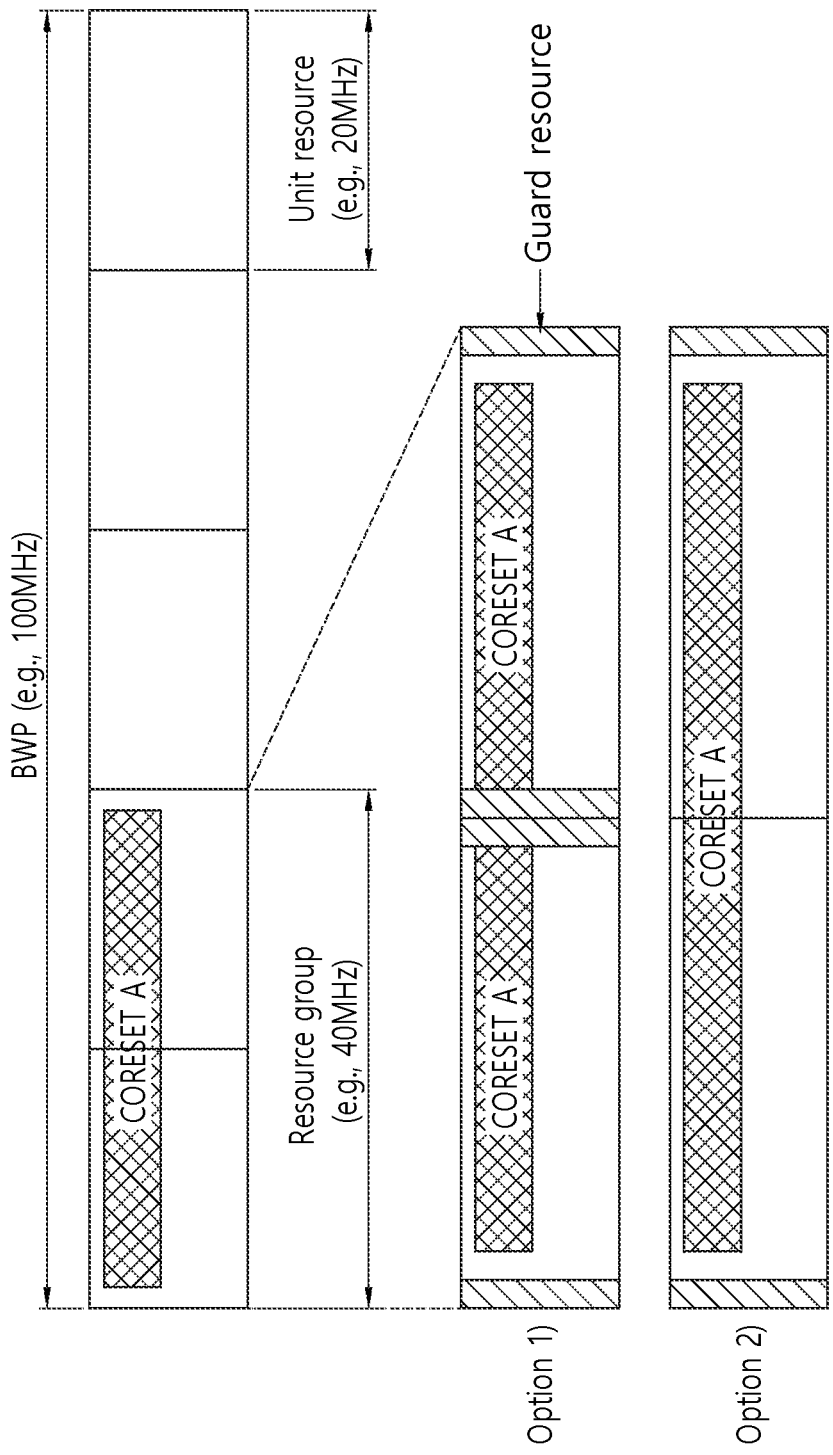
FIG. 21 shows general examples of a relationship between unit resource and guard resource.

FIG. 21 shows general examples of a relationship between unit resource and guard resource.

Option 1) Guard resource per unit resource

A guard resource may be defined for each unit resource, and, in case of a resource group being configured of multiple unit resources, resource mapping for PDCCH/PDSCH may be defined while considering a guard resource.

For example, in case a CORESET is configured throughout 2 unit resources, REG, CCE mapping, and so on, within the corresponding CORESET may be performed while excluding the guard resource. Even if a specific CORESET is configured to a contiguous RB, in case a guard resource exists within a CORESET region, this may be interpreted as multiple contiguous RB sets. This may also mean that, in case a wideband RS (i.e., larger precoder granularity) is configured to the corresponding CORESET, a same precoding may be performed only within each contiguous RB set.

Option 2) Guard resource per resource group

In case there is little uncertainty in the availability of resource(s), configuring a guard resource to all unit resources may cause a decrease in resource usability. As a method for increasing resource usability, proposed herein is a method of aligning a guard resource based on a resource group (on one or more unit resources) being indicated by the network.

Herein, in the present specification, a resource group may be configured of one unit resource or multiple unit resources.

In this case, for a CORESET being configured through different unit resource within a same resource group, REG, CCE index, and so on, may be performed for a whole CORESET resource.

In this example, CORESET A of Option 2 may include a larger number of REGs, CCEs, and so on, as compared to Option 1.

Additionally, in case an actually used resource is determined in sub-band units within a BWP, as described above, it is proposed herein that one search space set may be associated with multiple CORESETs.

It is defined in the current specification (e.g., 3GPP TS 36 series or TS 38 series) so that a COREST index being associated with a corresponding SS set within a search space set configuration can be configured. Herein, however, only one CORESET may be configured.

However, in case a resource that can actually be used in sub-band units within a BWP varies, as described in the present specification, it may be efficient to set up configurations according to an amount of resource capable of using multiple CORESET/SS sets.

This may also be interpreted as a BW of a CORESET being changed according to a given situation.

At this point, it may be inefficient to configure an SS set for each of the corresponding CORESETs in light of signaling overhead (and, in light of configuration flexibility).

Therefore, it is proposed herein to associate one SS set with multiple CORESETs. Additionally, it may also be assumed that each SS set is connected only to a maximum of one CORESET in a specific time instance.

<Method 1: Resource Group Specific CORESET/SS Set with Same Configuration>

When the network signals a CORESET/SS set configuration to a UE, the network may also notify a group to which the corresponding configuration is applied. Herein, the same CORESET and SS set configuration may be applied to multiple resource groups.

At this point, a reference point of frequency domain resource allocation of a CORESET within a CORESET configuration may be configured as a lowest RB, and so on, of each resource group. (That is, a reference point may be configured.)

In other words, the UE may receive a CORESET configuration of the network, and a reference point may be configured of the lowest RB, and so on, (among multiple RBs) of each resource group.

At this point, the network may use a bitmap of 6RB units based on the reference point so as to perform frequency domain resource allocation for the CORESET.

In other words, the UE may receive a 6RB unit bitmap from the network, and the UE may use the received bitmap based on the reference point, so as to receive instructions on frequency domain resource allocation for the CORESET.

A more detailed description of the above-described example will be given later on (e.g., FIG. 24 to FIG. 28).

The above-described examples may mean that the corresponding CORESET is located at the same position within each resource group. That is, each CORESET may be allocated within multiple resource groups based on a single CORESET configuration.

A hashing function, which is performed to select a monitored candidate from each CORESET/SS set, may be operated as described below. In this case, since the same CORESET/SS set configuration is applied to each resource group, the same hashing function that is performed in order to perform monitoring in each CORESET may also be applied.

This may mean that monitoring of candidates located at relatively identical positions for each CORESET may be performed, and this is advantageous in that a search space per group may be configured through a single hashing process regardless of the number of resource groups to which the CORESET/SS set is equally applied.

In Method 1, which is proposed above, a method of equally applying a single CORESET/SS set configuration to each resource group (e.g., sub-band for NR-U) was proposed. This is advantageous in that signaling overhead caused by the CORESET/SS set configuration may be reduces, and that the CORESET and SS set configuration may be applied regardless of the availability of each resource group.

Conversely, if Method 1 is applied to all resource groups, in case all of the resource groups are available resources, PDCCH monitoring complexity may be increased. Therefore, the present specification proposes a resource group (e.g., sub-band for NR-U) having the corresponding CORESET/SS set configuration applied thereto to also be additionally configured by the network.

That is, multiple combinations (resource group+CORESET/SS set) that can actually be embodied may be instructed in advance, and the combination that is actually applied may be determined according to the resource that is available for usage afterwards.

For example, the network may designate a resource group to which a specific CORESET/SS set configuration is applied, among all resource groups, through a bitmap (or indication of CAP-BW start index and number of indexes), and so on, and the UE may apply the corresponding CORESET/SS set configuration to a resource that is available for usage among the corresponding resource group.

In NR-U, when a frequency band unit performing a channel access procedure (CAP) is defined as CAP-BW, and one carrier or band corresponding to a bandwidth part (BWP) may be configured of multiple CAP-BWs.

The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

Figure 22:
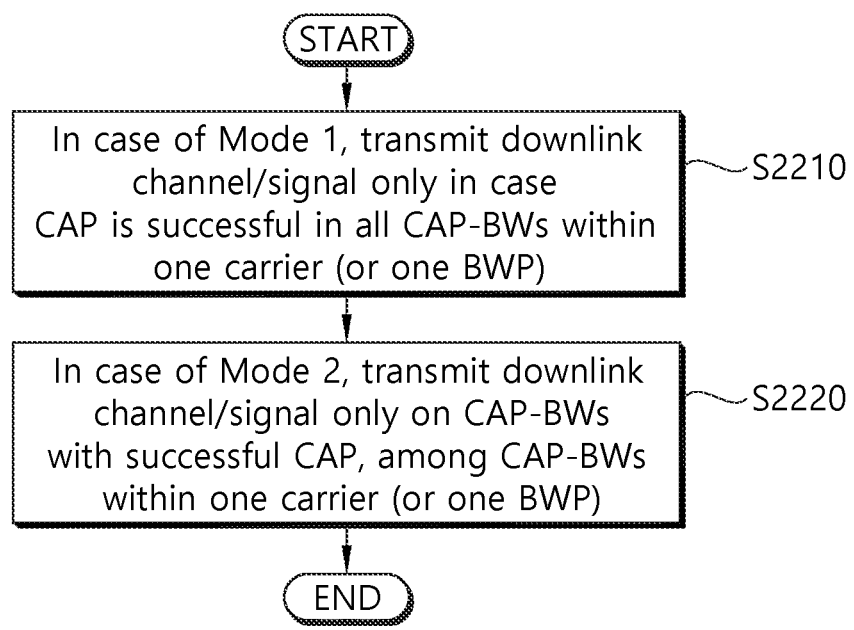
FIG. 22 shows an operation method of a base station according to an embodiment of the present specification.

FIG. 22 shows an operation method of a base station according to an embodiment of the present specification.

According to FIG. 22, in case the base station is in Mode 1, a downlink channel/signal may be transmitted only in a case where CAP is successful in all CAP-BWs within one carrier (or one BWP) (S2210). A more detailed example will be described later on.

Additionally, in case the base station is in Mode 2, a downlink channel/signal may be transmitted only on CAP-BWs with successful CAP, among the CAP-BWs within one carrier (or one BWP) (S2220). A more detailed example will be described later on.

A more detailed example of FIG. 22 will be described below.

In this specification, one CAP-BE size may have a fixed value or may be differently configured according to the configuration of the network (or base station). For example, one CAP-BW size may be fixed to 20 MHz, or may be variably configured based on higher layer signaling and/or DCI.

At this point, a downlink channel/signal may be transmitted only in a case where the base station performs CAP per CAP-BW and where the CAP is successful is all of the (single or) multiple CAP-BWs corresponding to a carrier or BWP or downlink channel/signal, such as PDCCH/PDSCH, and so on. And, otherwise, the downlink channel/signal may not be attempted (this will be referred to as Mode 1 for convenience).

Alternatively, according to the CAP result, a downlink channel/signal may be transmitted on a specific CAP-BW (with successful CAP), and a downlink channel/signal may not be transmitted on another CAP-BW (with failed CAP) (this will be referred to as Mode 2 for convenience).

(In case of Mode 2 transmission,) Transmission and non-transmission of part of the RBs/REs at both ends of the CAP-BW may vary depending on which CAP-BW is actually being transmitted (while considering requirements of in-band leakage and/or out-of-band emission, and so on).

In this specification, a resource group may correspond to a CAP-BW in an NR-U system. The base station may notify, to the UE, its operating mode by using a higher layer signal (RRC), a physical layer signal (DCI), or a combination of higher layer signal and physical layer signal.

<Method 2: CORESET Decomposition>

A network may configure a CORESET/SS set for a whole resource.

Herein, a network (e.g., base station) may transmit a CORESET/SS set configuration to a user equipment (UE), and, based on the CORESET/SS set configuration received from the network, the UE may receive instructions on the CORESET/SS set that is configured for the whole resource.

However, since there may occur a case where a specific group cannot be used, one candidate itself or CCE(s), REG bundles(s), REG(s), and so on, configuring one candidate may be selected from one resource group. That is, multiple resource groups may be configured within one CORESET, and one candidate may belong to one resource group.

In other words, multiple resource groups may be configured within one CORESET. At this point, there may occur a case where a specific group cannot be used, among the above-mentioned multiple resource groups. For this, the present specification proposes a configuration wherein one candidate itself or CCE(s), REG bundles(s), REG(s), and so on, configuring one candidate belong(s) to one resource group.

Additionally, the number of candidates per group may be independently configured. And, an exemplary method of implementing this will be described with reference to the appended drawing(s).

The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

Figure 23:
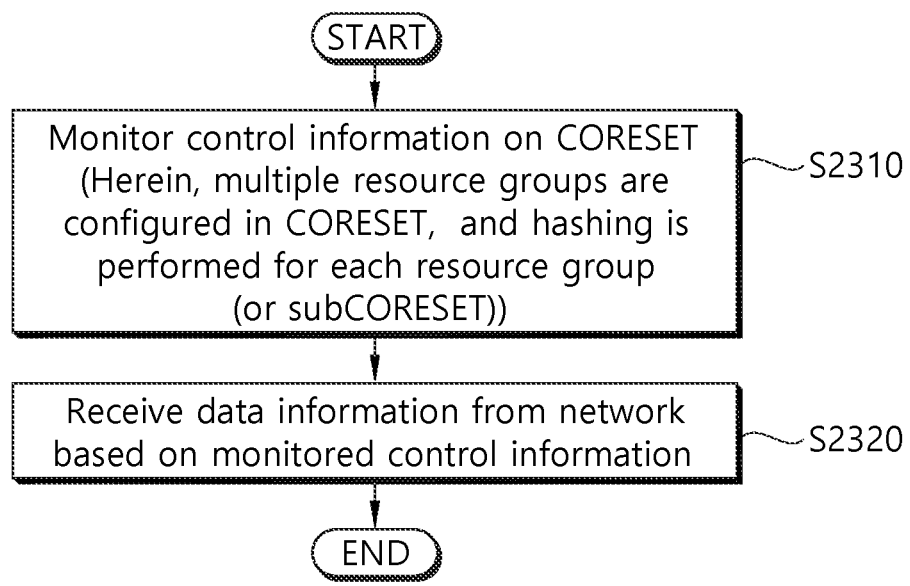
FIG. 23 is a flowchart of a method for monitoring control information on a CORESET according to an embodiment of the present specification.

FIG. 23 is a flowchart of a method for monitoring control information on a CORESET according to an embodiment of the present specification.

According to FIG. 23, a UE may monitor control information on a CORESET (S2310). Herein, multiple resource groups may be configured in the CORESET, and hashing may be performed per resource group (or per subCORESET).

That is, a resource size that is assumed in a hashing function may be assumed in a (sub)CORESET belonging to the corresponding resource group. And, then, hashing may be performed per resource group (or per subCORESET).

In other words, a resource size that is assumed in a hashing function may correspond to a (sub)CORESET belonging to a resource group to which the hashing function is applied. Thereafter, hashing may be performed per resource group (or per subCORESET).

Herein, for example, in case of assigning candidates starting from resource group 0, hashing may be performed based on a number of candidates configured in resource group 0 and a number of CCEs of a subCORESET belonging to resource group 0.

Thereafter, for resource group 1, hashing is performed based on a number of candidates configured in resource group 1 and a number of CCEs of a subCORESET belonging to resource group 1. And, at this point, it may be assumed that the actual candidate indexing is performed after the last candidate index of resource group 0.

The UE may receive data information from the network based on the monitored control information (S2320).

Additionally, ALs, number of candidates per AL (monitoring opportunity information), and so on, per subCORESET may also be independently configured. This is to allow the network to efficiently use resources, in case the network has information on the possibility to use each resource group (or availability for usage of each resource group).

Additionally, in case of configuring multiple subCORESETs to one CORESET, whether or not operation shall be performed based on a CORESET or based on a subCORESET may be indicated by the network.

Moreover, application or non-application of the subCORESET may be determined in accordance with a specific condition. For example, it may be assumed that the subCORESET is applied only in a case where the CORESET including multiple subCORESETs overlaps with a specific signal/channel (e.g., SSB).

<Method 3: Number of CORESETs>

Currently, in Rel-15, the number of CORESETs may be configured to 3 CORESETs or less per BWP, and, since each cell may be configured of 4 BWPs or less, in the viewpoint of a serving cell, up to 12 CORESETs may be configured per serving cell.

However, as described above, in case multiple resource groups are defined within one BWP, and in case a resource that can actually be used is determined by the availability of each resource group, a method for changing the existing limit on the number of CORESETs or for maintaining the existing limit on the number of CORESETs shall be considered.

For this, the present specification proposes the following method. (Although the following description is described based on the number of CORESETs, this may also be interpreted as a maximum number of TCIs that need to be supported per BWP.)

Alt 1) Same as Rel-15 (or Rel-16) (e.g., Maximum of 3 CORESETs Per BWP, Maximum of 4 BWPs Per Cell)

Herein, the existing limit may be maintained, and, for this, just as Method 1, which is proposed above, a method of applying the same CORESET configuration to each resource group may be provided.

Additionally, as proposed above, a method for configuring a reference point for CORESET resource allocation may need to be defined differently from that of Rel-15.

Additionally, in case a maximum number of CORESETs per BWP increases for a multiple TRP scenario of MIMO, it may be possible to apply the corresponding limit.

In this case, since the maximum number of CORESETs supportable per UE by the UE capability may vary, different reference standards may be applied to each UE.

For example, in case it is assumed that a specific BWP is configured of 5 resource groups for the NR-U operation, a UE having 5 CORESETs supportable per BWP by the UE capability configures the CORESET per resource group, and a UE having 3 CORESETs supportable per BWP may perform CORESET configuration through a method of applying the same CORESET configuration to multiple resource groups by using the above-described Method 1.

Alt 2) Increase in Limit for the Number of CORESETs Per BWP

As another method, a method for increasing the maximum number of CORESETs that can be configured per BWP may also be considered.

For example, in case a maximum bandwidth for NR-U operation is 100 MHz, and in case a resource group (subband) of each BWP is 20 MHz, the maximum number of CORESETs per BWP may be increased to 5.

Additionally, since a CORESET index of a TCI activation MAC CE is currently defined as 4 bits, in order to maintain the existing structure, the number of CORESETs per serving cell may be maintained to its maximum number of 12 CORESETs, or the number of CORESETs may be increased to 16 CORESETs that can be indicated by 4 bits.

<Method 4: Frequency Domain Resource Allocation for CORESET>

Currently, resource allocation for a CORESET in a frequency domain is configured to be performed through 6RB unit bitmap starting from a common PRB 0 (which is indicated via RRC signaling). That is, based on the common PRB 0, which is a global reference (i.e., a reference that is configured regardless of a current cell or location on a frequency of a BWP), frequency domain resource allocation of a CORESET is performed.

Additionally, in case a starting point of the corresponding cell or BWP does not align with a 6RB unit resource grid based on PRB 0, allocation may be performed, for the first time, starting from a resource that is aligned with the 6RB unit resource grid based on PRB 0 in the corresponding cell or BWP. That is, CORESET resource configuration can only be performed by the 6RB unit resource grid based on PRB 0.

Additionally, the present specification has already proposed a method allowing a specific candidate to exist in one resource group by adjusting the application range of the hashing function through the above-described embodiments.

This may also be interpreted as a method for ensuring resources of a control channel even in a case where a specific resource group cannot be used.

In case this method is not used (that is, in case the CORESET includes multiple resource groups, and in case the hashing function operates within the whole CORESET resource), by adjusting the resource amount of the CORESET, one candidate may be prevented from being distributed to multiple resource groups.

However, in order to use this method, a limitation condition stating that resource of the correspond CORESET shall be configured of $2^n$ number of CCEs (i.e., a CORESET shall be configured of $6*2^n$ number of REG) may be provided herein.

Based on such situations, the present specification proposes a CORESET resource allocation method as described below. The following methods may be implemented independently or in combination. (For example, Option 1 may be applied, and Option 2 may be operated as a condition of Option 2.)

Option 1) 6RB-Unit Bitmap for Available Resource of Each Resource Group within a Specific BWP As described above, a reference point for the frequency domain resource allocation of a CORESET within the CORESET configuration may be configured of the lowest RB of each resource group.

In other words, the UE may receive instructions (or indications) on the reference point of resource allocation of a CORESET from the base station via higher layer signaling (e.g., CORESET configuration, and so on) (in other words, for example, the network may configure the reference point), and, at this point, the reference point for resource allocation of a CORESET may be configured of the lowest RB of each resource group. Herein, higher layer signaling may also means RRC signaling and/or MAC signaling.

The present specification shall additionally provide more detailed examples of the disclosures presented above. And, hereinafter, the more detailed examples will be described with reference to the appended drawings.

The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

Figure 24:
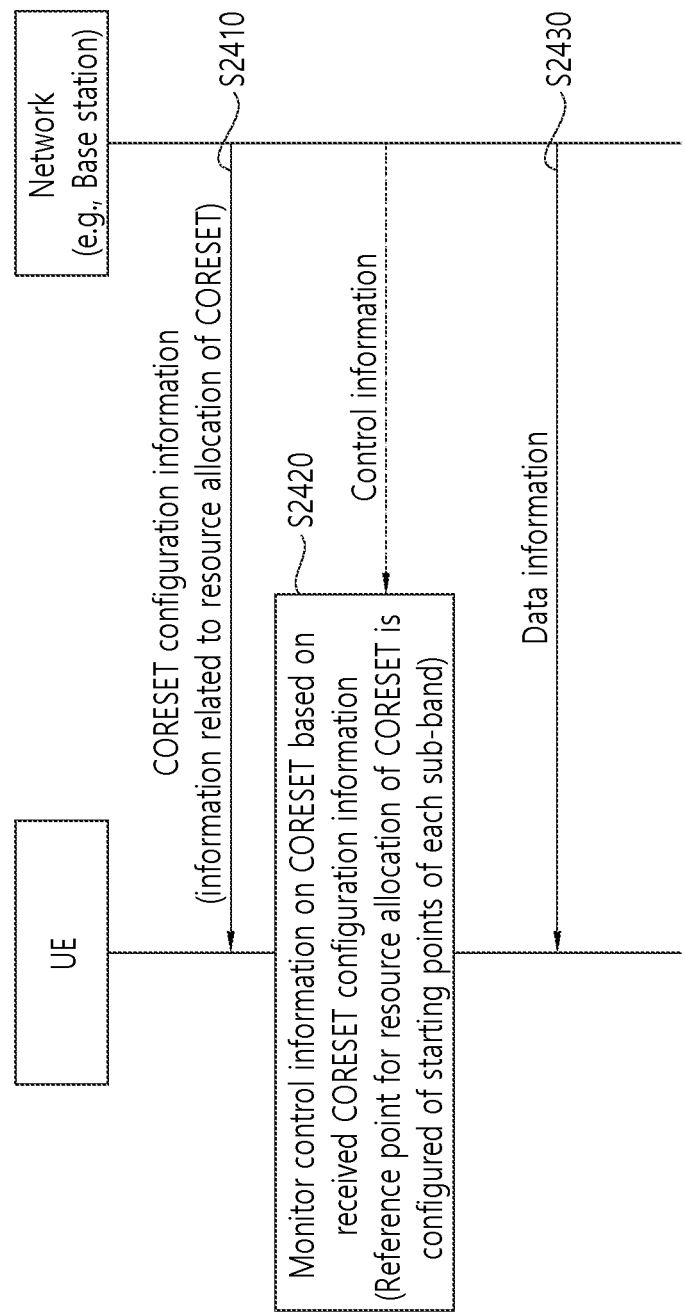
FIG. 24 is a flowchart of a method for receiving CORESET configuration information according to an embodiment of the present specification.

FIG. 24 is a flowchart of a method for receiving CORESET configuration information according to an embodiment of the present specification.

At this point, unless the above-described disclosures of FIG. 24 are interleaved with the above-described embodiments (or the embodiments that will be described later on) (e.g., embodiments of Method 0 to Method 4), the disclosures of FIG. 24 may be combined to one another.

According to FIG. 24, a UE may receive CORESET configuration information from a network (e.g., base station) (S2410). Herein, the CORESET configuration information may be information related to resource allocation of a CORESET. Content of the CORESET configuration information, and detailed content of the information related to resource allocation of a CORESET are the same as the description presented above (or the description that will be presented below).

The UE may monitor control information on the CORESET based on the CORESET configuration information (S2420). At this point, a reference point for the resource allocation of the CORESET may be configured of starting points of each sub-band.

Regarding the sub-band in this embodiment, one (activated) BWP (e.g., being configured to a UE) may include multiple sub-bands (in the viewpoint of a frequency domain). For example, as described above, in case a BWP (being configured for a UE) (occupied BW; e.g., 100 MHz) exists, a total of 5 20 MHz unit sub-bands (otherwise referred to as resource groups) may be included in the aforementioned BWP.

Herein, a sub-band may mean a resource group that is described above (or that will be described below). Herein, for example, the term sub-band and the term resource group may be interchangeably used for convenience in the description of the present specification.

For example, a bandwidth part (BWP) including multiple sub-bands may be configured in the UE.

Additionally, for example, the resource allocation may be resource allocation in a frequency domain.

Additionally, for example, the reference point may be a resource block having a lowest index, among the resource blocks included in each of the sub-bands.

Herein, the reference point may be a resource block having the lowest index, among resource blocks being available for usage and being included in each of the sub-bands. At this point, a guard resource is included in each of the sub-bands, and the resource blocks being available for usage may be resource blocks excluding the guard resource, among the resource blocks being included in the sub-bands.

Herein, the resource allocation may be based on a bitmap. At this point, the resource allocation may be based on the bitmap of 6 resource block units starting from a resource block having the lowest index.

More specifically, it may be assumed that the network and the UE receive resource allocation for a CORESET of a BWP, which includes a resource group, through a 6RB unit bitmap from an RB having the lowest index (or lowest index among RBs having 6RB units aligned from the common PRB 0), among the available resource of the corresponding resource group that is not the common PRB 0 (or resource group having a predetermined specific index, such as the lowest index, among multiple resource groups within a CORESET).

Herein, the available resource may mean a resource through which an actual control channel may be transmitted. And, for example, in case a guard band (for RF filtering, leakage blocking, and so on) is defined, this may mean a resource excluding the corresponding guard band.

That is, as presented in the above-described example, an available resource may mean a resource excluding a guard resource from the resource group.

Herein, as described above, in case one CORESET exists throughout multiple resource groups, a guard resource may be located at both front end/rear end of a resource group. For example, in case one CORESET exists throughout a first resource group and a second resource group, a guard resource may be located at both the front end and rear end of the first resource group, and a guard resource may be located at both the front end and rear end of the second resource group.

Alternatively, as described above, in case one CORESET exists throughout multiple resource groups, instead of being located at both front end/rear end of a resource group, a guard resource may be located only at the front end/rear end of the CORESET. For example, in case one CORESET exists throughout a first resource group and a second resource group, the guard resource may be located only at a front end of the first resource group and at a rear end of the second resource group.

Additionally, for example, the CORESET may be configured throughout a first sub-band and a second sub-band. At this point, a resource for the COREST may be allocated based on a bitmap connecting a first bitmap for the first sub-band and a second bitmap for the second sub-band.

More specifically, in case of Option 1, in case a CORESET is configured throughout multiple resource groups, frequency domain resource allocation of the corresponding CORESET may be implemented as a method of allocating resource for all CORESETs by connecting the bitmaps for each resource group.

For example, in case a specific BWP is configured of 2 resource groups, resource allocation of the corresponding CORESET may be performed by connecting (e.g., 21 bits)

a bitmap for resource group 1 (e.g., 10 bits) and a bitmap for resource group 2 (e.g., 11 bits).

Alternatively, in combination with Method 1, by performing bitmap for resource group 1+2-bit bitmap, additional signaling may be carried out in order to indicate to which resource group, from resource group 1 and resource group 2, the CORESET resource corresponding to resource group 1 shall be applied.

The UE may receive data information from the network based on the monitored control information (S2430). Herein, a detailed example wherein the UE receives data information, from the network, based on the monitored control information For example, the control information may be a physical downlink control channel (PDCCH), and the data information may be a physical downlink shared channel (PDSCH).

Meanwhile, the example described in FIG. 24 may also be implemented as a UE.

For example, a user equipment (UE) may include a transceiver transmitting and receiving radio signals, and a processor being operatively connected to the transceiver. Herein, the processor may be configured to receive control resource set (CORESET) configuration information from a network, wherein the CORESET configuration information is information related to resource allocation of CORESET, to monitor control information on the CORESET, based on the received CORESET configuration information, and to receive data information from the network based on the monitored control information, wherein a reference point for the resource allocation of the CORESET may be configured of starting points of each sub-band based on the CORESET configuration information.

Herein, the UE may communicate with at least one of a mobile terminal, the network, and a self-driving vehicle other than the UE.

The example of FIG. 24 may be described in the viewpoint of the UE as follows.

The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

Figure 25:
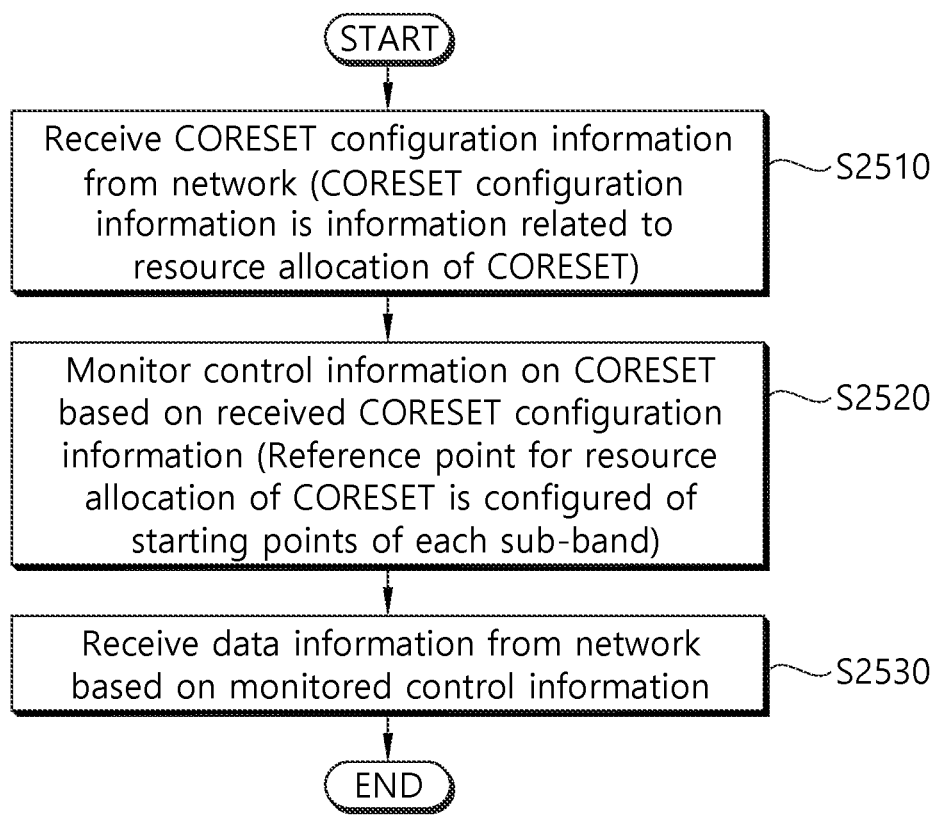
FIG. 25 is a flowchart of a method for receiving CORESET configuration information, in the viewpoint of the UE, according to an embodiment of the present specification.

FIG. 25 is a flowchart of a method for receiving CORESET configuration information, in the viewpoint of the UE, according to an embodiment of the present specification.

According to FIG. 25, the UE may receive CORESET configuration information from a network (S2510). And, at this point, the CORESET configuration information may be information related to resource allocation of CORESET. A more detailed example of this example is the same as the description that is presented above (or that will be presented below). And, therefore, for simplicity in the description, repeated description of overlapping descriptions will be omitted.

The UE may monitor control information on the CORESET, based on the received CORESET configuration information (52520). And, herein, a reference point for the resource allocation of the CORESET may be configured of starting points of each sub-band based on the CORESET configuration information. A more detailed example of this example is the same as the description that is presented above (or that will be presented below). And, therefore, for simplicity in the description, repeated description of overlapping descriptions will be omitted.

The UE may receive data information from the network based on the monitored control information (S2530). A more detailed example of this example is the same as the description that is presented above (or that will be presented below). And, therefore, for simplicity in the description, repeated description of overlapping descriptions will be omitted.

Figure 26:
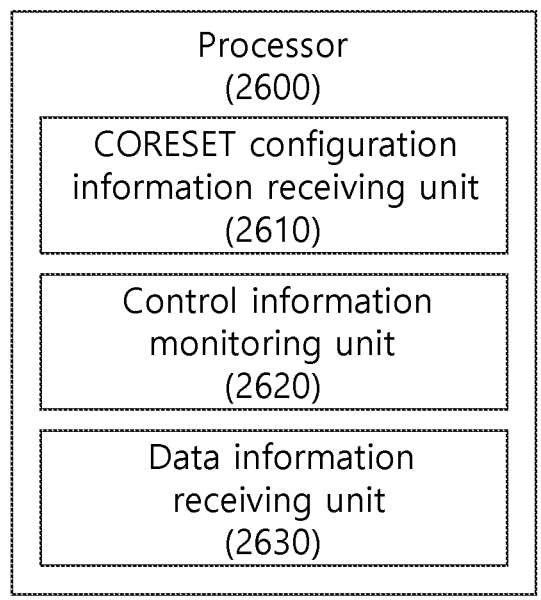
FIG. 26 is a block diagram of an exemplary device for receiving CORESET configuration information, in the viewpoint of the UE, according to an embodiment of the present specification.

FIG. 26 is a block diagram of an exemplary device for receiving CORESET configuration information, in the viewpoint of the UE, according to an embodiment of the present specification.

According to FIG. 26, a processor (2600) may include a CORESET configuration information receiving unit (2610), a control information monitoring unit (2620), and a data information receiving unit (2630). Herein, the processor (2600) may be the processor(s) shown in FIG. 29 to FIG. 34.

The CORESET configuration information receiving unit (2610) may receive CORESET configuration information from a network. And, at this point, the CORESET configuration information may be information related to resource allocation of CORESET. A more detailed example of this example is the same as the description that is presented above (or that will be presented below). And, therefore, for simplicity in the description, repeated description of overlapping descriptions will be omitted.

The control information monitoring unit (2620) may monitor control information on the CORESET, based on the received CORESET configuration information. And, herein, a reference point for the resource allocation of the CORESET may be configured of starting points of each sub-band based on the CORESET configuration information. A more detailed example of this example is the same as the description that is presented above (or that will be presented below). And, therefore, for simplicity in the description, repeated description of overlapping descriptions will be omitted.

The data information receiving unit (2630) may receive data information from the network based on the monitored control information. A more detailed example of this example is the same as the description that is presented above (or that will be presented below). And, therefore, for simplicity in the description, repeated description of overlapping descriptions will be omitted.

The example of FIG. 24 may be described in the viewpoint of the network (e.g., base station) as follows.

The appended drawings have been illustrated to describe the detailed examples of the present specification. It shall be understood that the names of the specific device(s) or specific signal(s)/message(s)/field(s) are proposed merely as examples. And, therefore, the technical features of this specification will not be limited only to the specific names (or terms) used in the appended drawings.

Figure 27:
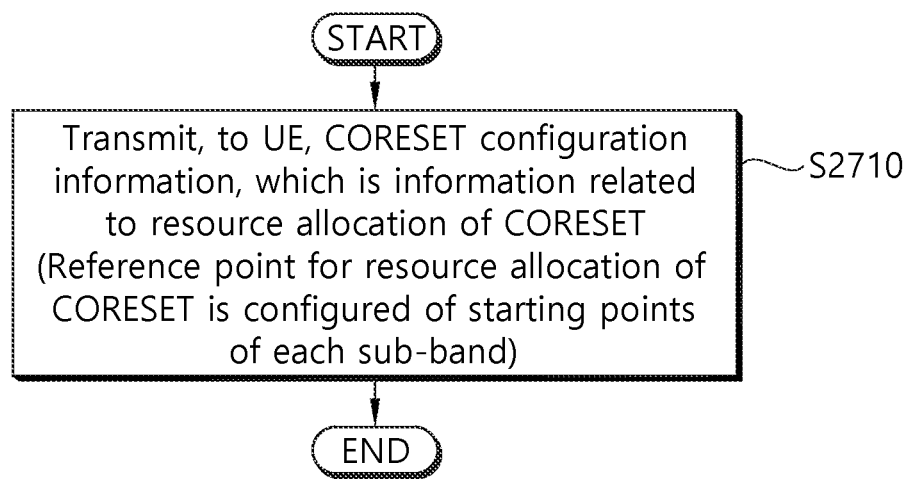
FIG. 27 is a flowchart of a method for transmitting CORESET configuration information, in the viewpoint of the base station, according to an embodiment of the present specification.

FIG. 27 is a flowchart of a method for transmitting CORESET configuration information, in the viewpoint of the base station, according to an embodiment of the present specification.

According to FIG. 27, a network may transmit, to a UE, CORESET configuration information, which is information related to resource allocation of a CORESET (S2710). And, at this point, a reference point for the resource allocation of the CORESET may be configured of starting points of each sub-band based on the CORESET configuration information. A more detailed example of this example is the same as the description that is presented above (or that will be presented below). And, therefore, for simplicity in the description, repeated description of overlapping descriptions will be omitted.

Figure 28:
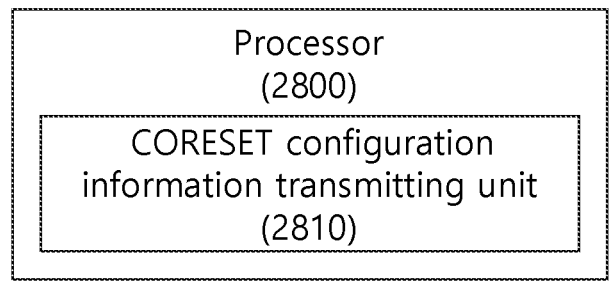
FIG. 28 is a block diagram of an exemplary device for transmitting CORESET configuration information, in the viewpoint of the base station, according to an embodiment of the present specification.

FIG. 28 is a block diagram of an exemplary device for transmitting CORESET configuration information, in the viewpoint of the base station, according to an embodiment of the present specification.

According to FIG. 28, a processor (2800) may include a CORESET configuration information transmitting unit (2810). Herein, the processor (2800) may be the processor(s) shown in FIG. 29 to FIG. 34.

The CORESET configuration information transmitting unit (2810) may transmit, to a UE, CORESET configuration information, which is information related to resource allocation of a CORESET. And, herein, a reference point for the resource allocation of the CORESET may be configured of starting points of each sub-band based on the CORESET configuration information. A more detailed example of this example is the same as the description that is presented above (or that will be presented below). And, therefore, for simplicity in the description, repeated description of overlapping descriptions will be omitted.

Option 2) Limitation on Amount of CORESET Resource

Regardless of the resource allocation method, for a specific CORESET, a limit on an amount of resource being allocated from each resource group may be defined. For example, a condition specifying that an amount of resource being allocated for a specific CORESET from each resource group belonging to a specific BWP shall be configured of a resource corresponding to $2^n$ number of CCEs (or a number of CCEs, wherein the number is an integer).

Additionally, even if the aforementioned condition is satisfied, in case the amount of resource being allocated for a specific CORESET from each group varies, since one candidate may be distributed to multiple resource groups, the aforementioned condition may additionally a condition specifying that the resource groups allocating a specific CORESET within a specific BWP shall all allocated the same amount of resource.

Furthermore, the corresponding condition may be applied only in a case where CCE-to-REG mapping is applied by using the non-interleaved method, or the corresponding condition may be applied to a case where the CORESET corresponds to a search space being associated with a specific DCI format (e.g., a group common PDCCH including at least time/frequency axis channel occupancy information of the base station).

Option 3) Truncation of Allocated Resources

In case the CORESET that is configured by the network fails to satisfy a specific condition, truncation of the corresponding CORESET resource may be considered.

For example, in case the CORESET included in each group (or part of a specific CORESET) is not configured of a resource corresponding to $2^n$ number of CCEs (or a number of CCEs, wherein the number is an integer), the UE may deliver (or transport) the currently configured resource until the conditions for the $2^n$ number of CCEs (or a number of CCEs, wherein the number is an integer) are satisfied.

For example, in case a specific CORESET is allocated as 1 symbol & 50 RBs in a specific CORESET, the UE may truncate 2 RBs of the lowest part (or highest part) of the corresponding frequency domain resource and may then perform the subsequent operations.

Alternatively, CCE(s) may be configured by grouping the RBs that are to be truncated according to the above-described rule(s) to one group (or multiple groups).

Figure 29:
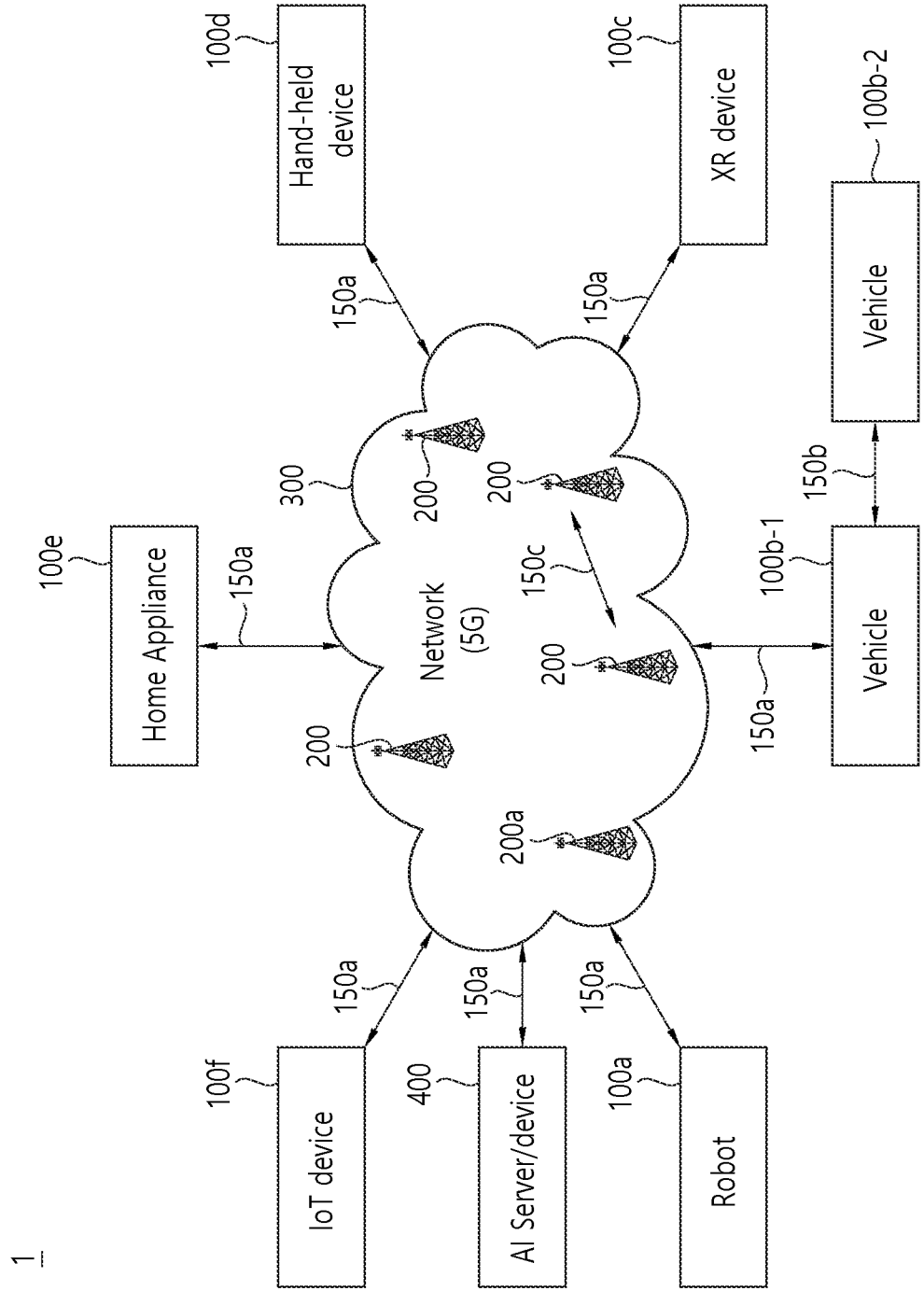
FIG. 29 shows an exemplary communication system (1), according to an embodiment of the present specification.

FIG. 29 shows an exemplary communication system (1), according to an embodiment of the present specification.

Referring to FIG. 29, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An Artificial Intelligence (AI) technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

Figure 30:
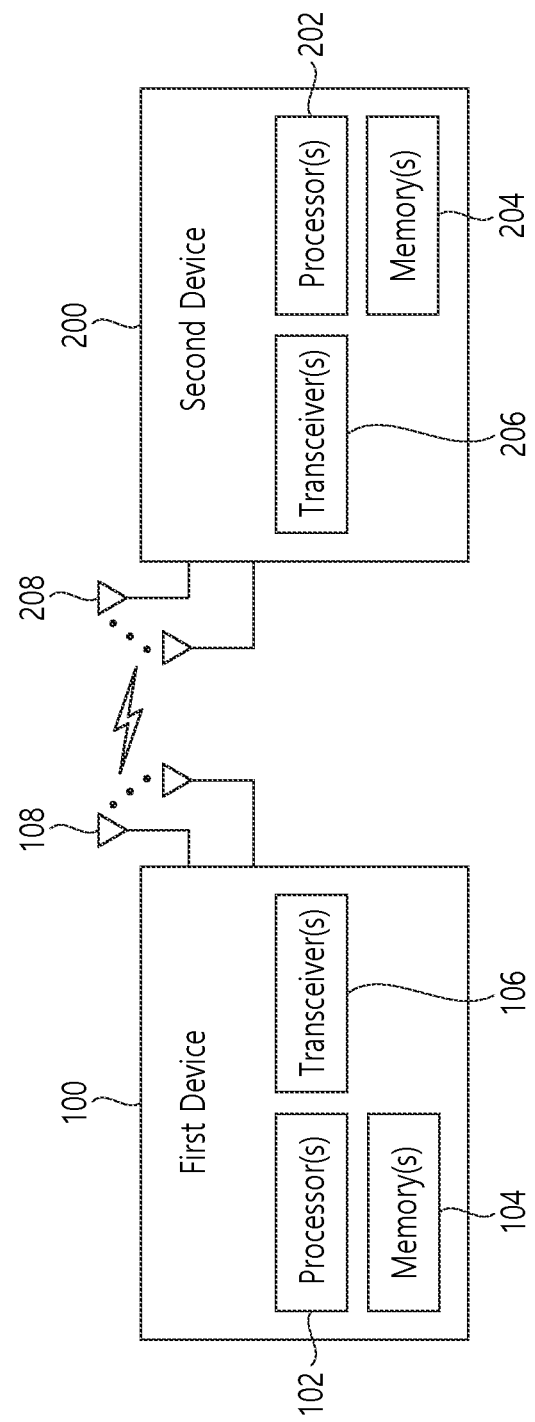
FIG. 30 shows an exemplary wireless device to which the present specification can be applied.

FIG. 30 shows an exemplary wireless device to which the present specification can be applied.

Referring to FIG. 30, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 29.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Hereinafter, an example of a signal processing circuit to which the present specification is applied will be described in detail.

Figure 31:
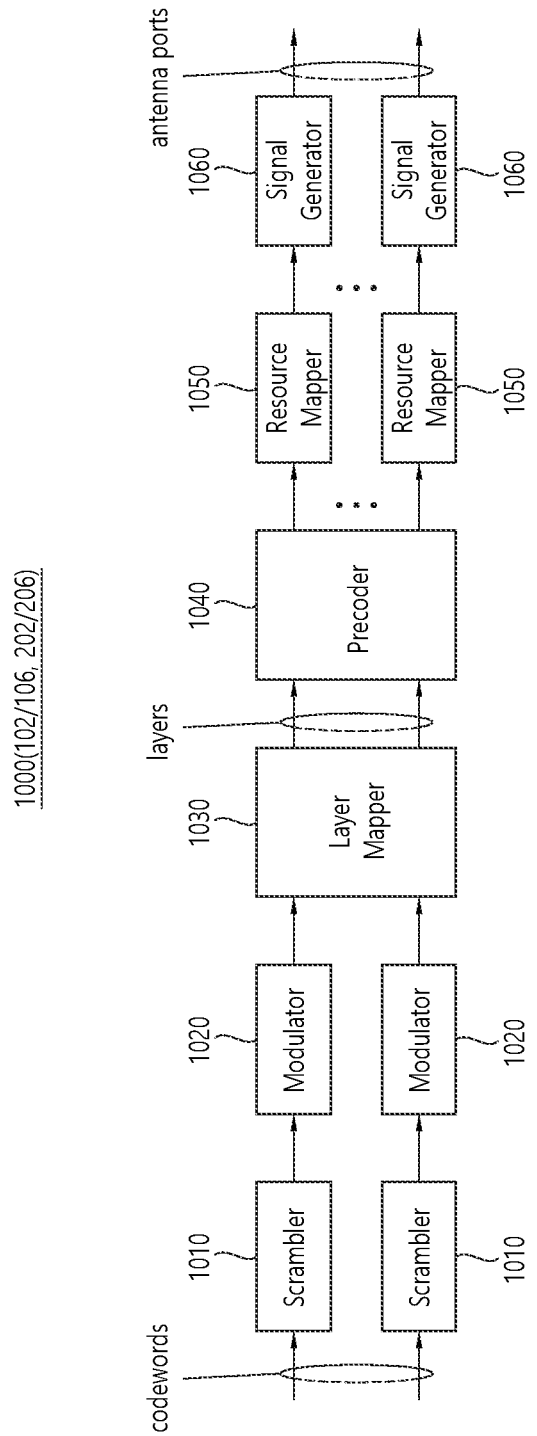
FIG. 31 shows a signal process circuit for a transmission signal according to an embodiment of the present specification.

FIG. 31 shows a signal process circuit for a transmission signal according to an embodiment of the present specification.

Referring to FIG. 31, a signal processing circuit (1000) may include scramblers (1010), modulators (1020), a layer mapper (1030), a precoder (1040), resource mappers (1050), and signal generators (1060). An operation/function of FIG. 31 may be performed, without being limited to, the processors (102, 202) and/or the transceivers (106, 206) of FIG. 30. Hardware elements of FIG. 31 may be implemented by the processors (102, 202) and/or the transceivers (106, 206) of FIG. 30. For example, blocks 1010-1060 may be implemented by the processors (102, 202) of FIG. 30. Alternatively, the blocks 1010-1050 may be implemented by the processors (102, 202) of FIG. 30 and the block 1060 may be implemented by the transceivers (106, 206) of FIG. 30.

Codewords may be converted into radio signals via the signal processing circuit (1000) of FIG. 31. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010-1060) of FIG. 31. For example, the wireless devices (e.g., 100, 200 of FIG. 30) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 32:
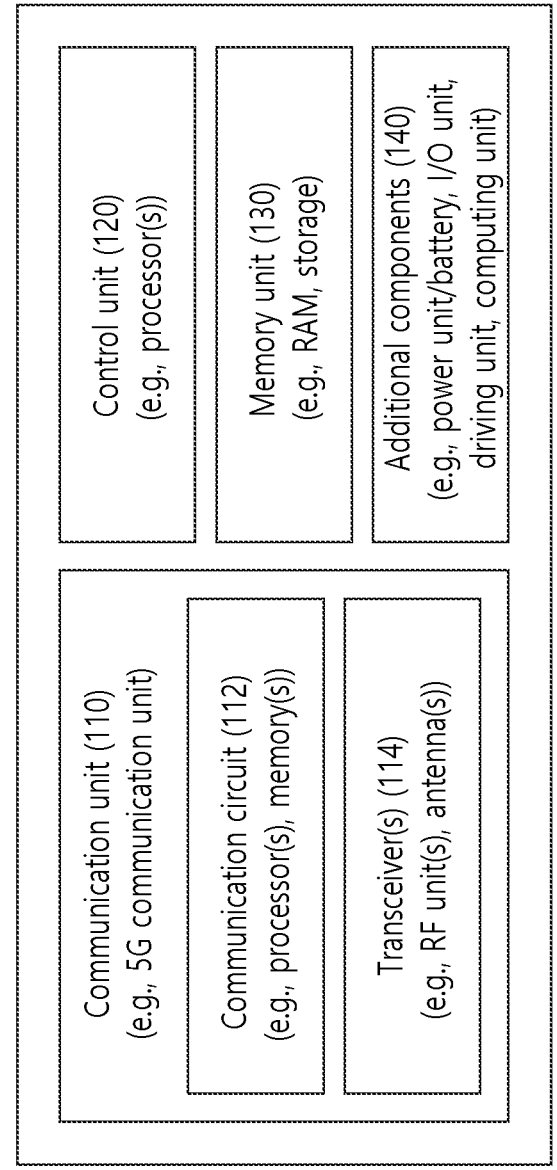
FIG. 32 shows another example of a wireless device according to an embodiment of the present specification.

FIG. 32 shows another example of a wireless device according to an embodiment of the present specification.

The wireless device may be implemented in various forms according to a use-case/service (refer to FIG. 29).

Referring to FIG. 32, wireless devices (100, 200) may correspond to the wireless devices (100, 200) of FIG. 30 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 30. For example, the transceiver(s) (114) may include the one or more transceivers (106, 206) and/or the one or more antennas (108, 208) of FIG. 30. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 29), the vehicles (100*b*-1, 100*b*-2 of FIG. 29), the XR device (100*c* of FIG. 29), the hand-held device (100*d* of FIG. 29), the home appliance (100*e* of FIG. 29), the IoT device (100*f* of FIG. 29), a digital broadcast terminal, a hologram device, a public safety device, an MTC device, a medicine device, a fintech device (or a finance device), a security device, a climate/environment device, the AI server/device (400 of FIG. 29), the BSs (200 of FIG. 29), a network node, and so on. The wireless device may be used in a mobile or fixed place according to a usage-example/service.

In FIG. 32, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 32 will be described in detail with reference to the drawings.

Figure 33:
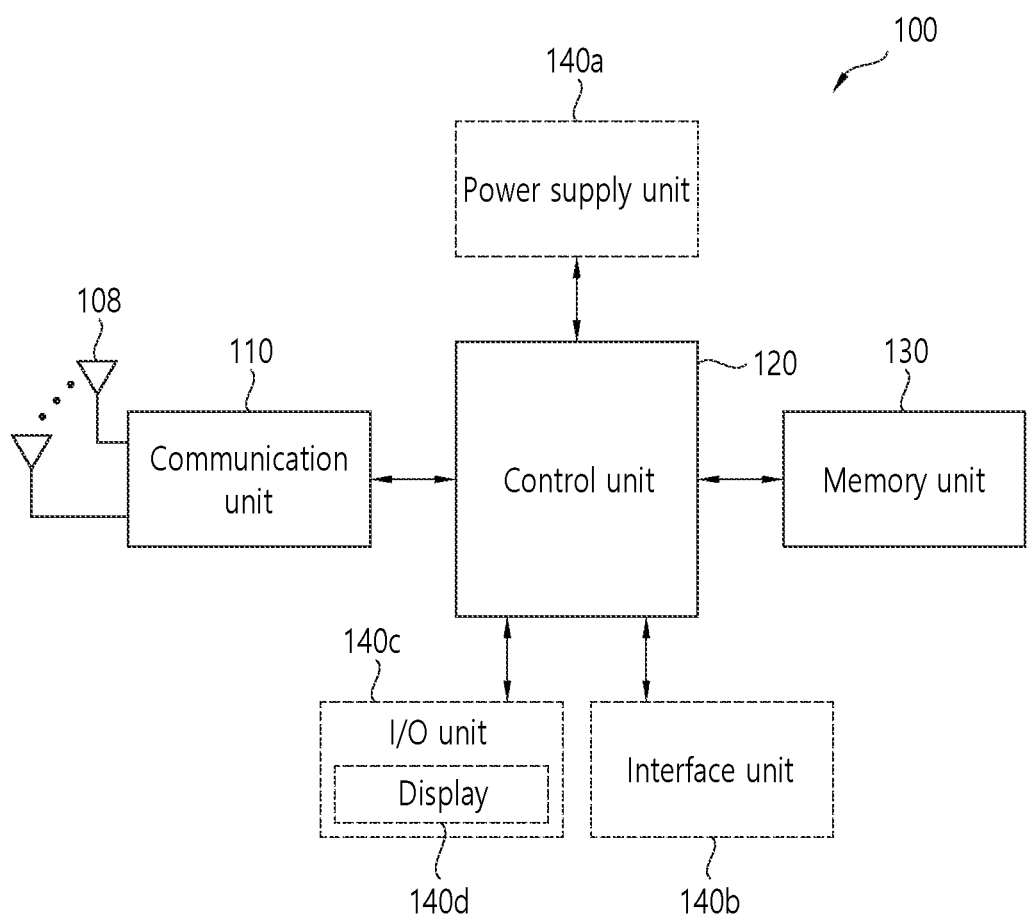
FIG. 33 shows a hand-held device to which the present specification is applied.

FIG. 33 shows a hand-held device to which the present specification is applied.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 33, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110-130/140*a*-140*c* correspond to the blocks 110130/140 of FIG. 32, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 34:
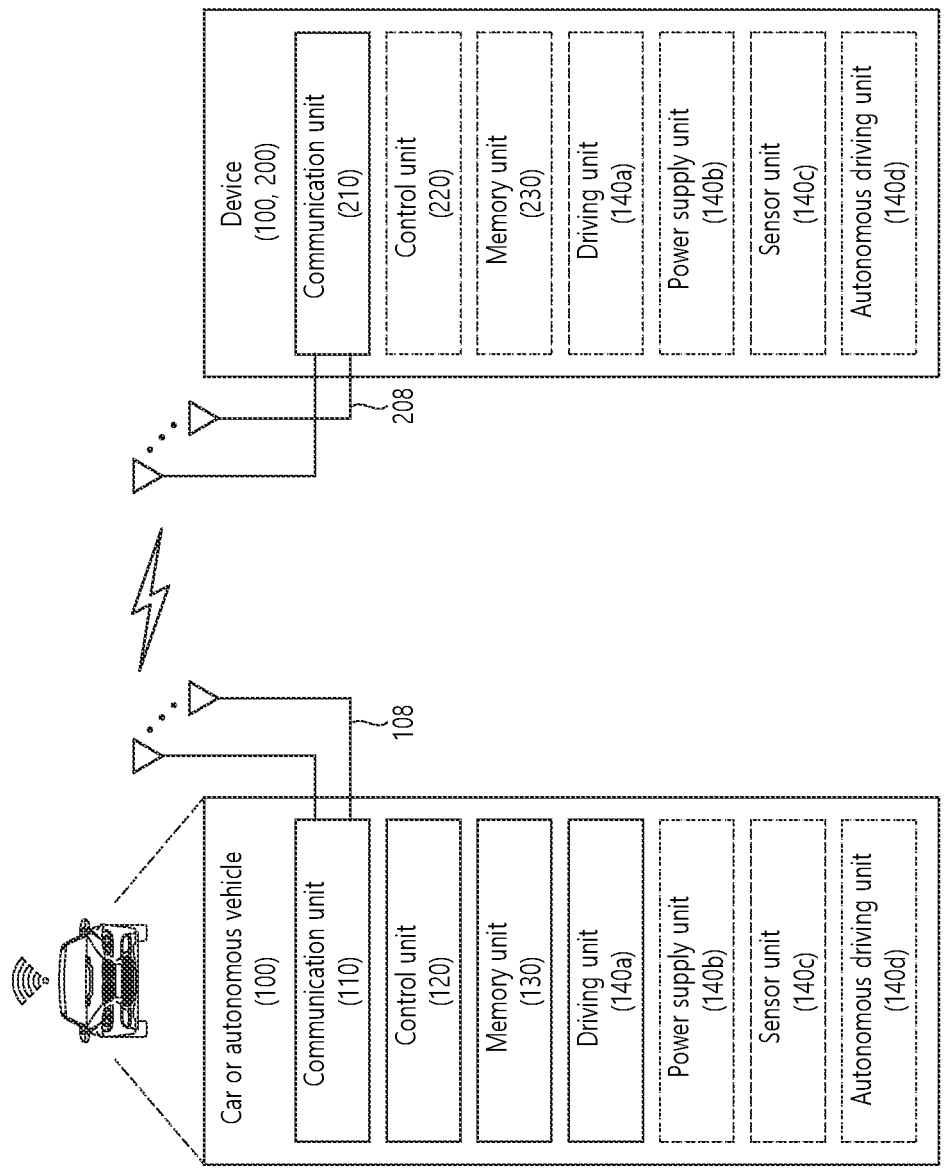
FIG. 34 shows a vehicle or an autonomous vehicle to which the present specification is applied.

FIG. 34 shows a vehicle or an autonomous vehicle to which the present specification is applied.

The vehicle or autonomous vehicle may be implemented by a mobile robot, a car, a train, a manned/unmanned Aerial Vehicle (AV), a ship, and so on.

Referring to FIG. 34, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 32, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method performed by a user equipment (UE) operating in a wireless communication system, the method comprising:

receiving, from a network, control resource set (CORESET) configuration information, wherein the CORESET configuration information is information related to configuring a CORESET, monitoring downlink control information on the CORESET based on the CORESET configuration information; and receiving, from the network, a downlink data based on the downlink control information, wherein the CORESET configuration information includes information related to configuring at least one reference point for a frequency domain resource allocation of the CORESET, wherein the information related to configuring the at least one reference point informs a resource block value in units of a resource block, wherein a bandwidth part (BWP) of the UE comprises a plurality of resource sets, wherein all of the plurality of resource sets are resource sets for the UE, wherein each of the plurality of resource sets includes a plurality of resource blocks, wherein the information related to configuring the at least one reference point is commonly applied to the all of the plurality of resource sets, and wherein the frequency domain resource allocation of the CORESET is performed based on the at least one reference point and a bitmap indicated in units of six resource blocks in the each of the plurality of resource sets.

2. The method of claim 1, wherein the at least one reference point of each the plurality of resource sets is a resource block different from a lowest resource block among the plurality of resource blocks included in the each of the plurality of resource sets.

3. A user equipment (UE) comprising:

a transceiver;

at least one processor; and at least one computer memory operably connectable to the at least one processor and storing instructions that, when executed by the at least one processor, perform operations comprising:

receiving, from a network, control resource set (CORESET) configuration information, wherein the CORESET configuration information is information related to configuring a CORESET, monitoring downlink control information on the CORESET based on the CORESET configuration information; and receiving, from the network, a downlink data based on the downlink control information, wherein the CORESET configuration information includes information related to configuring at least one reference point for a frequency domain resource allocation of the CORESET, wherein the information related to configuring the at least one reference point informs a resource block value in units of a resource block, wherein a bandwidth part (BWP) of the UE comprises a plurality of resource sets, wherein all of the plurality of resource sets are resource sets for the UE, wherein each of the plurality of resource sets includes a plurality of resource blocks, wherein the information related to configuring the at least one reference point is commonly applied to the all of the plurality of resource sets, and wherein the frequency domain resource allocation of the CORESET is performed based on the at least one reference point and a bitmap indicated in units of six resource blocks in the each of the plurality of resource sets.

4. An apparatus comprising:

at least one processor; and at least one computer memory operably connectable to the at least one processor and storing instructions that, when executed by the at least one processor, perform operations comprising:

receiving, from a network, control resource set (CORESET) configuration information, wherein the CORESET configuration information is information related to configuring a CORESET, monitoring downlink control information on the CORESET based on the CORESET configuration information; and receiving, from the network, a downlink data based on the downlink control information, wherein the CORESET configuration information includes information related to configuring at least one reference point for a frequency domain resource allocation of the CORESET, wherein the information related to configuring the at least one reference point informs a resource block value in units of a resource block, wherein a bandwidth part (BWP) of the UE comprises a plurality of resource sets, wherein all of the plurality of resource sets are resource sets for the apparatus, wherein each of the plurality of resource sets includes a plurality of resource blocks, wherein the information related to configuring the at least one reference point is commonly applied to the all of the plurality of resource sets, and wherein the frequency domain resource allocation of the CORESET is performed based on the at least one reference point and a bitmap indicated in units of six resource blocks in the each of the plurality of resource sets.

* * * * *